US012202283B2

(12) United States Patent
Shioya et al.

(10) Patent No.: US 12,202,283 B2
(45) Date of Patent: Jan. 21, 2025

(54) PRINTER

(71) Applicant: SATO HOLDINGS KABUSHIKI KAISHA, Tokyo (JP)

(72) Inventors: Takashi Shioya, Tokyo (JP); Tamotsu Katayama, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 18/036,999

(22) PCT Filed: Nov. 10, 2021

(86) PCT No.: PCT/JP2021/041357

§ 371 (c)(1),
(2) Date: May 15, 2023

(87) PCT Pub. No.: WO2022/107661

PCT Pub. Date: May 27, 2022

(65) Prior Publication Data

US 2023/0406017 A1 Dec. 21, 2023

(30) Foreign Application Priority Data

Nov. 18, 2020 (JP) ................................ 2020-191645
Sep. 27, 2021 (JP) ................................ 2021-156365

(51) Int. Cl.
*B41J 15/04* (2006.01)
*B41J 2/32* (2006.01)
(Continued)

(52) U.S. Cl.
CPC ................ *B41J 29/13* (2013.01); *B41J 2/32* (2013.01); *B41J 11/04* (2013.01); *B41J 15/04* (2013.01)

(58) Field of Classification Search
CPC .......... B41J 11/04; B41J 15/04; B41J 15/042; B41J 29/13; B41J 29/02; B41J 29/00; B41J 29/023; B41J 29/026
See application file for complete search history.

(56) References Cited

U.S. PATENT DOCUMENTS

2016/0052304 A1 2/2016 Obara
2016/0236492 A1 8/2016 Hutnak et al.
(Continued)

FOREIGN PATENT DOCUMENTS

CA 275806 * 11/1927 ............ B41J 15/042
CA 2757806 A1 * 6/2012 .......... B41J 11/0025
(Continued)

*Primary Examiner* — Kristal Feggins
(74) *Attorney, Agent, or Firm* — Foley & Lardner LLP

(57) ABSTRACT

A printer includes a body case that includes a placement surface for the printer and an accommodating chamber for accommodating a roll body into which a belt-shaped print medium are wound; a printer cover configured to open and close the accommodating chamber; a platen roller that is attached to the printer cover and configured to convey the belt-shaped print medium drawn out of the roll body; and a hinge that includes a hinge shaft and is configured to couple the printer cover with the body case so that the printer cover is swingable about the hinge shaft relative to the body case. The printer cover includes an upper surface portion and an inclined surface portion, the inclined surface portion being provided between the hinge shaft and the upper surface portion and inclined relative to the placement surface.

14 Claims, 32 Drawing Sheets

(51) Int. Cl.
*B41J 11/04* (2006.01)
*B41J 29/13* (2006.01)

(56) References Cited

U.S. PATENT DOCUMENTS

| | | | | |
|---|---|---|---|---|
| 2017/0291438 | A1 | 10/2017 | Hirose | |
| 2017/0308013 | A1 * | 10/2017 | Buthrath | B41J 15/042 |
| 2019/0347909 | A1 * | 11/2019 | Kaneko | H05K 5/0217 |

FOREIGN PATENT DOCUMENTS

| | | | | |
|---|---|---|---|---|
| JP | H06-166229 | A | 6/1994 | |
| JP | H06-052274 | U | 7/1994 | |
| JP | 2007-176007 | A | 7/2007 | |
| JP | 2014-188708 | A1 | 10/2014 | |
| JP | 2016-120666 | A | 7/2016 | |
| JP | 2017217862 | * | 12/2017 | B41J 15/04 |

* cited by examiner

PRINTER

FIELD

The present invention relates to a printer that prints information on a print medium.

BACKGROUND

Conventionally, thermal printers that print on a print medium by thermal transfer are known (hereinafter simply referred to as "printers"). In such printers, a print medium is held in a pressurized state between a thermal head and a platen roller, and heating elements on the thermal head are selectively heated to print.

In some printers, the platen roller is attached to an openable printer cover provided at the upper part of a roll body accommodating chamber (e.g., Japanese Laid-open Patent publication No. 2014-188708 and Japanese unexamined Utility Model Application Publication No. H6-52274).

BRIEF SUMMARY

Technical Problem

In the printer disclosed in the Publication No. 2014-188708, the printer cover is opened about a hinge located substantially at the upper end of the rear of the body, but it does not fully open the roll body accommodating chamber. The user cannot easily set in or remove a roll body from the roll body accommodating chamber.

In the printer disclosed in the Publication No. H6-52274, the printer cover is opened about a hinge located substantially at the lower end of the rear of the body. The printer cover is opened until a projecting part, provided at the tip of a guide part integrated with the printer cover, abuts on a stopper provided at the body of the printer. The maximum open angle of the printer cover at which the projecting part abuts on the stopper is about 45 degrees.

Therefore, even when the printer cover is fully open, it still covers at least the upper half of the roll body accommodating chamber, preventing the user from easily setting or removing the roll body from the roll body accommodating chamber.

An object of the present invention is to provide a printer with a great maximum open angle by which a printer cover is opened.

Solution to Problem

An embodiment of the present invention is a printer including: a body case that includes a placement surface for the printer and an accommodating chamber for accommodating a roll body into which a belt-shaped print medium are wound; a printer cover configured to open and close the accommodating chamber; a platen roller that is attached to the printer cover and configured to convey the belt-shaped print medium drawn out of the roll body; and a hinge that includes a hinge shaft and is configured to couple the printer cover with the body case so that the printer cover is swingable about the hinge shaft relative to the body case. The printer cover comprises an upper surface portion and an inclined surface portion, the inclined surface portion being provided between the hinge shaft and the upper surface portion and inclined relative to the placement surface. $H1<H2$ is established where H1 is defined as a height from the placement surface to the hinge shaft and H2 is defined as a height from the placement surface to a highest position from the hinge shaft to the upper surface portion.

Advantageous Effects

An embodiment of the present invention increases the maximum open angle by which the printer cover is opened.

DETAILED DESCRIPTION

In the following, a description will be given of embodiments, of a printer of the present invention.

First Embodiment (1) Structure of Printer

In the following, with reference to FIGS. 1A, 1, and 2, a description will be given of a printer 1 according to an embodiment.

Figure 1A:
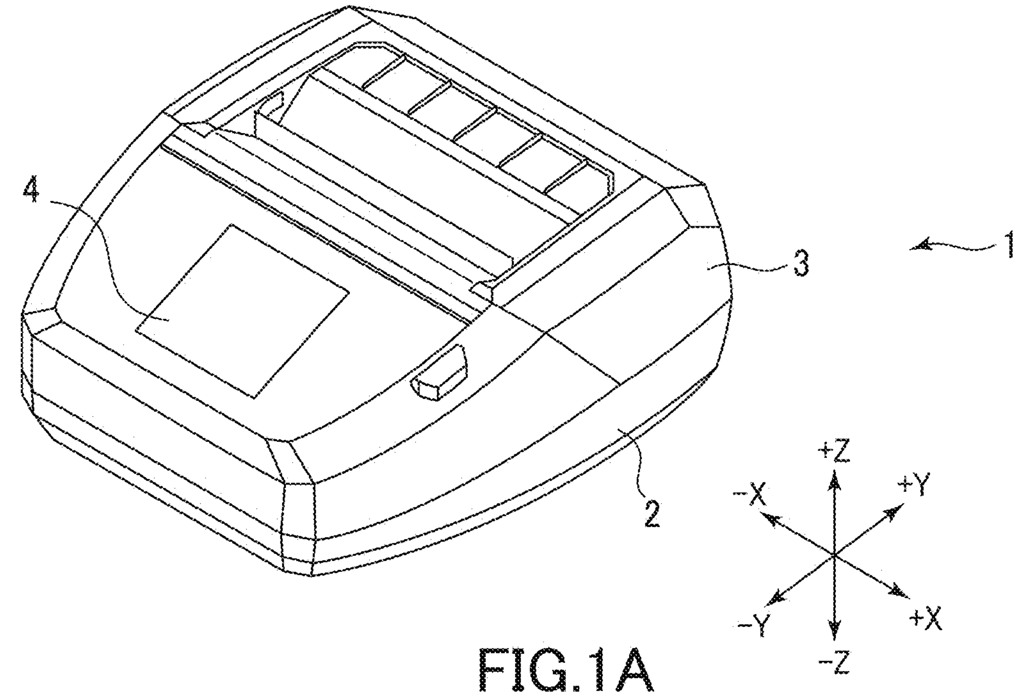
FIG. 1A is a perspective view of a printer according to an embodiment, showing its front, top, and left faces with its printer cover closed.
Figure 1B:
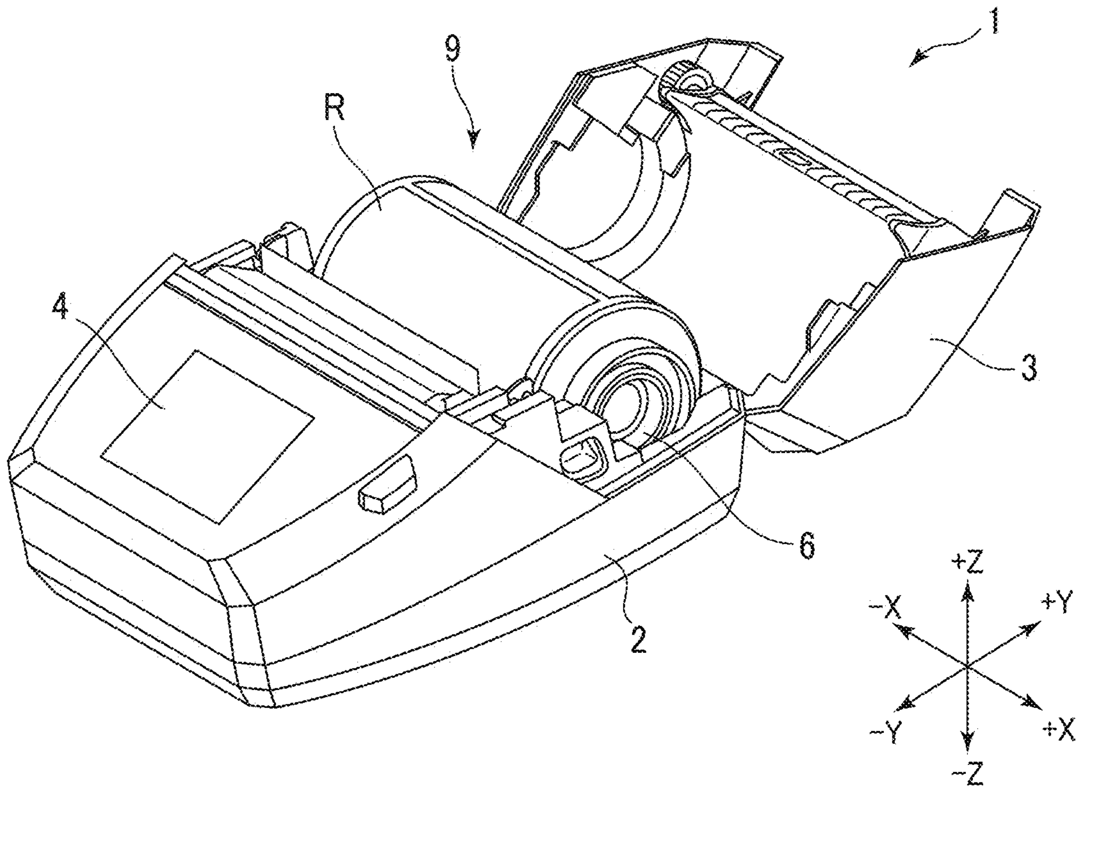
FIG. 1B is a perspective view of the printer according to an embodiment, showing its front, top, and left faces with its printer cover open by a maximum open angle.

FIG. 1A is a perspective view of the printer 1 according to the embodiment showing its front, top, and left faces with the printer cover 3 closed. FIG. 1B is a perspective view of the printer 1 according to the embodiment showing its front, top, and left faces with the printer cover 3 open. FIG. 2 is a perspective view of the printer 1 according to the embodiment of the present invention showing its rear, upper, and left faces.

Figure 2:
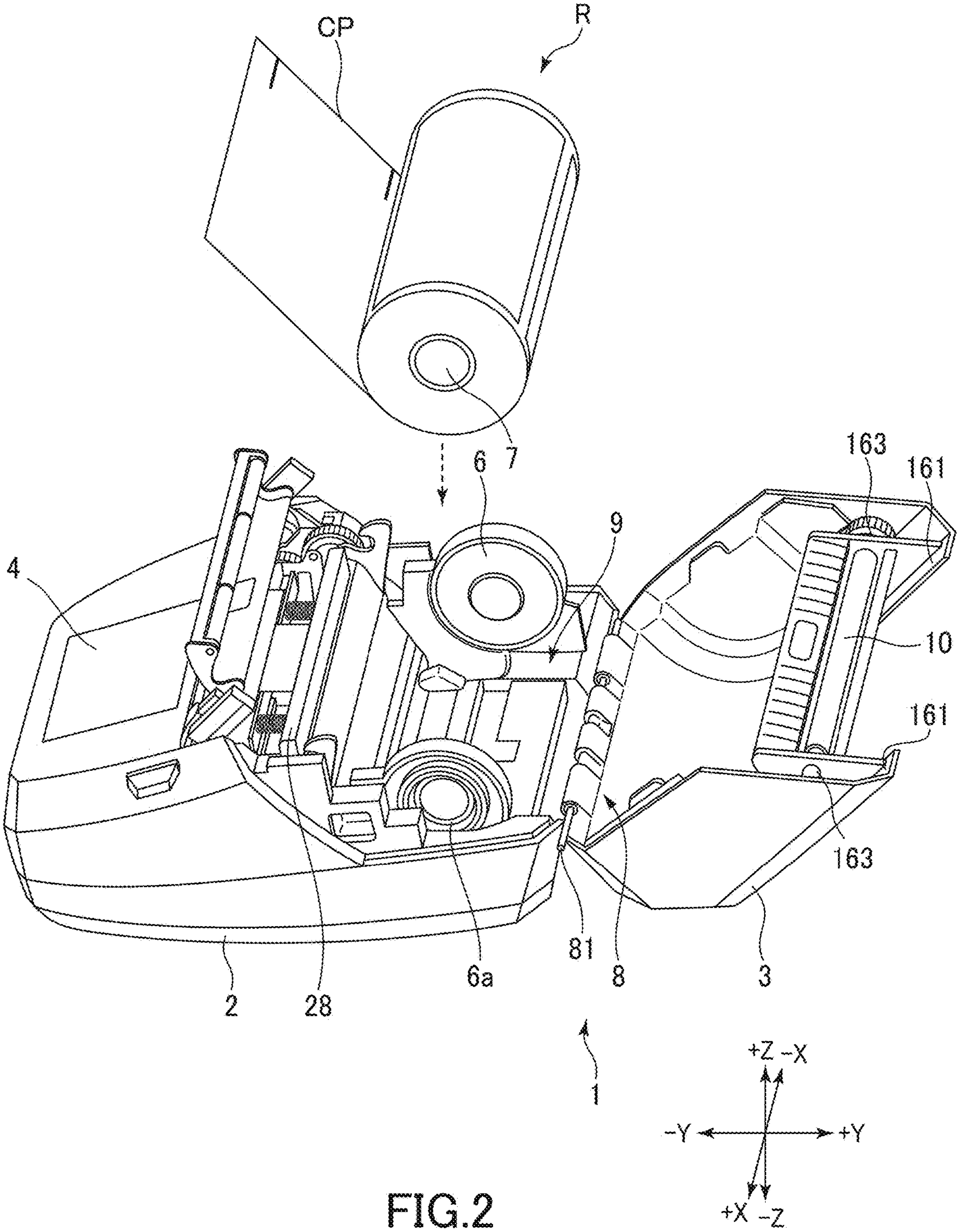
FIG. 2 is a rear perspective view of the printer according to an embodiment, showing its rear, top, and left faces with its printer cover open by a maximum open angle.

As shown in FIGS. 1A, 1B, and 2, the printer 1 according to the present embodiment includes a body case 2, a printer cover 3, a display panel 4, a platen roller 10, and a thermal head 28.

As shown in FIG. 1A, the bottom surface of the printer 1 is substantially rectangular. A direction along its long side is defined as a front-rear direction. That is, it is defined that a side with the display panel 4 is the front (−Y) and the opposite printer cover side is the rear (+Y). The right side (−X), the left side (+X), the top side (+Z), and the bottom side (−Z) are defined relative to the front-rear direction. In the following description, as appropriate, the right (−X) or left (+X) direction is referred to as the lateral direction, and the top (+Z) or bottom (−Z) direction is referred to as the top-bottom direction. In the drawings, the directions may be defined on XYZ axes.

As shown in FIG. 2, the printer 1 may include a roll body accommodating chamber 9 for accommodating a roll body, which has a sheet of paper wound around to be printed. The body case 2 may include an inner bottom surface 2*a* (see FIG. 18) for the roll body to be placed on.

The printer cover 3 is a cover that opens or shuts off the inside (e.g., the roll body accommodating chamber 9) of the printer 1. A hinge 8, including a hinge shaft 81, is provided at the rear end of the printer cover 3. The hinge 8 rotatably supports the printer cover 3 to be rearwardly openable relative to the body case. As used herein, “rearwardly openable” means that the printer cover 3 is opened about the hinge 8 on the rear end side of the printer cover 3.

The display panel 4 functions as an input/output interface for the user, and is a liquid crystal display panel with the touchscreen function, for example.

Figure 18:
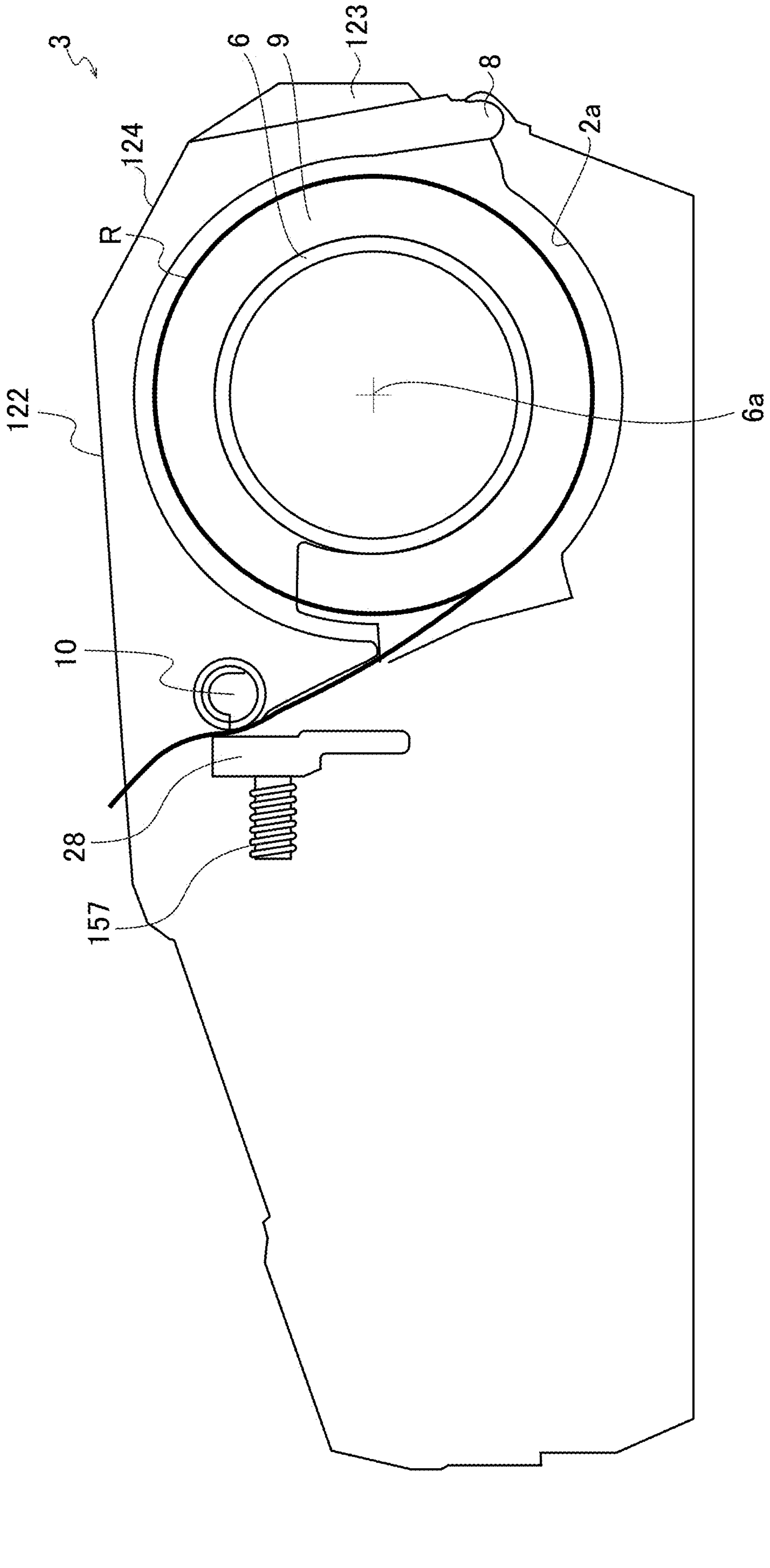
FIG. 18 is a side sectional view of the printer according to an embodiment.

As shown in FIG. 2, an attachment part 163 is provided at a front inner surface portion 161 of the printer cover 3, which is an inner surface portion opposite to the side where the hinge 8 is. The attachment part 163 holds a platen roller 10 to be rotatable in the forward and reverse directions. As shown in FIG. 18, when the printer cover 3 is closed, the platen roller 10 is disposed behind the thermal head 28.

The platen roller 10 is conveying means that is mounted on the printer cover 3 and conveys a continuous sheet CP drawn out of a roll body R, which is accommodated in the roll body accommodating chamber 9 while retained by a pair of roll body guides 6. The platen roller extends along the width direction of the roll body R. The platen roller 10 is mechanically coupled to a stepping motor (not shown) or the like to be driven.

The roll body R includes a core 7 and the belt-shaped continuous sheet CP wound around the core 7.

The roll body guides 6 support both side surfaces of the roll body R accommodated in the roll body accommodating chamber 9. The center of the roll body guides 6 matches the center of the roll body R.

As shown in FIG. 18, the hinge 8 is disposed at a lower position than an axis 6*a* of the roll body guides 6. Accordingly, the hinge 8 is positioned lower than the axis of the roll body R set in the printer 1 by the roll body guides 6. Thus, the hinge 8 is positioned frontward in the front-rear direction as compared to the case where the hinge 8 is disposed at the identical height to the axis 6*a* of the roll body guides 6. This reduces the size of the printer 1 in the front-rear direction.

The thermal head 28 is printing means that prints information such as characters, symbols, graphics, or barcodes on the sheet of the roll body R. As shown in FIG. 18, when the printer cover 3 is closed, the printing surface of the thermal head 28 faces a feeding path of the sheet and is opposed to the platen roller 10. A plurality of heat elements (not shown) that generate heat when energized are arranged on the printing surface of the thermal head 28 along the width direction of the sheet. The thermal head 28 is connected to a circuit board (not shown) that transmits print signals to the thermal head 28.

As shown in FIG. 18, on the back side of the thermal head 28, a coil spring 157 as a biasing member is provided for providing biasing force to the thermal head 28.

When the printer cover 3 is closed and printing is carried out, the sheet is held between the platen roller 10 and the thermal head 28 while conveyed by the platen roller 10. Here, the thermal head 28 is pressed against the platen roller 10 by the biasing force, generating a head pressure suitable for printing.

(2) Body Case

Figure 3:
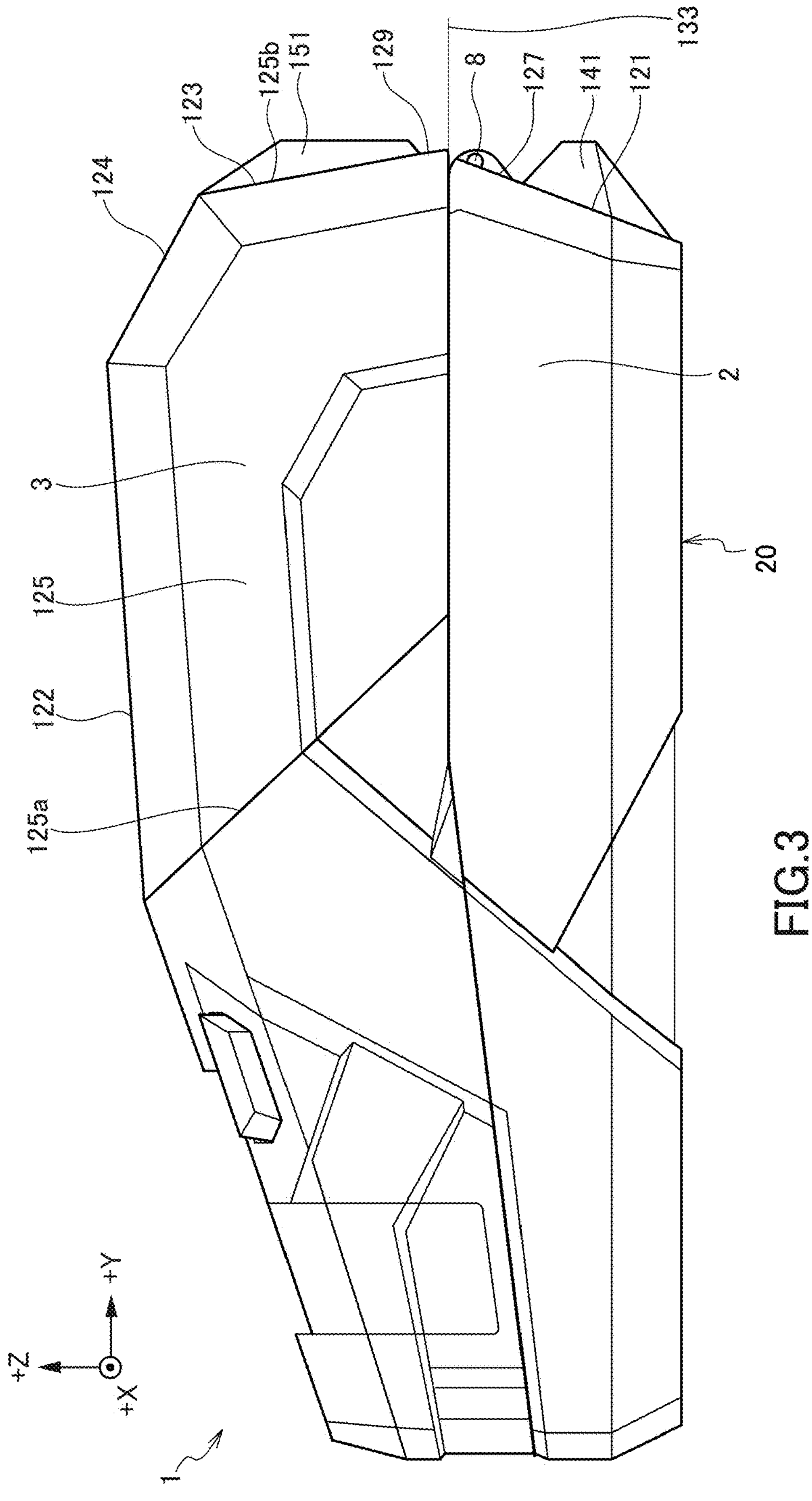
FIG. 3 is a side view of the printer according to an embodiment, with its printer cover closed.

The body case 2 includes the roll body accommodating chamber 9. Around the roll body accommodating chamber 9, the body case 2 covers the lower half of the roll body accommodating chamber 9 on the right and left sides and from behind. As shown in FIG. 3, the bottom surface of the body case 2 is a placement surface 20 on which the printer 1 is placed for operation.

As shown in FIG. 3, a rear surface portion 121 of the body case 2 is inclined to be oriented obliquely downward on the rear side.

(3) Printer Cover

Around the roll body accommodating chamber 9, the printer cover 3 covers the upper half of the roll body accommodating chamber on the right and left sides and from behind and above.

As shown in FIG. 3, a rear surface portion 123 of the printer cover 3 is inclined to be oriented obliquely upward on the rear side.

Accordingly, a rear projecting part is formed at the boundary between an upper peripheral part 127 of the rear surface portion 121 of the body case 2 and a lower peripheral part 129 of the rear surface portion 123 of the printer cover 3. Accordingly, the boundary between the upper peripheral part 127 of the rear surface portion 121 of the body case 2 and the lower peripheral part 129 of the rear surface portion 123 of the printer cover 3 is at a position projecting on the rear side of the printer 1.

As shown in FIG. 3, when the printer cover 3 is at the closed position, a pair of front sides 125*a* of side surface portions 125 on the right and left sides of the printer cover 3 are inclined downward toward the rear. The pair of front sides 125*a* are positioned farthest from the hinge 8 in the side surface portions 125, which are opposed to and spaced apart from each other in the axial direction of the hinge shaft 81, of the printer cover 3. The pair of front sides 125*a* are inclined toward the hinge 8 side from the open side to the closed side of the printer cover 3. Accordingly, when the printer cover 3 is opened or closed, the side surface portions 125 will not interfere with the body case 2.

Figure 9:
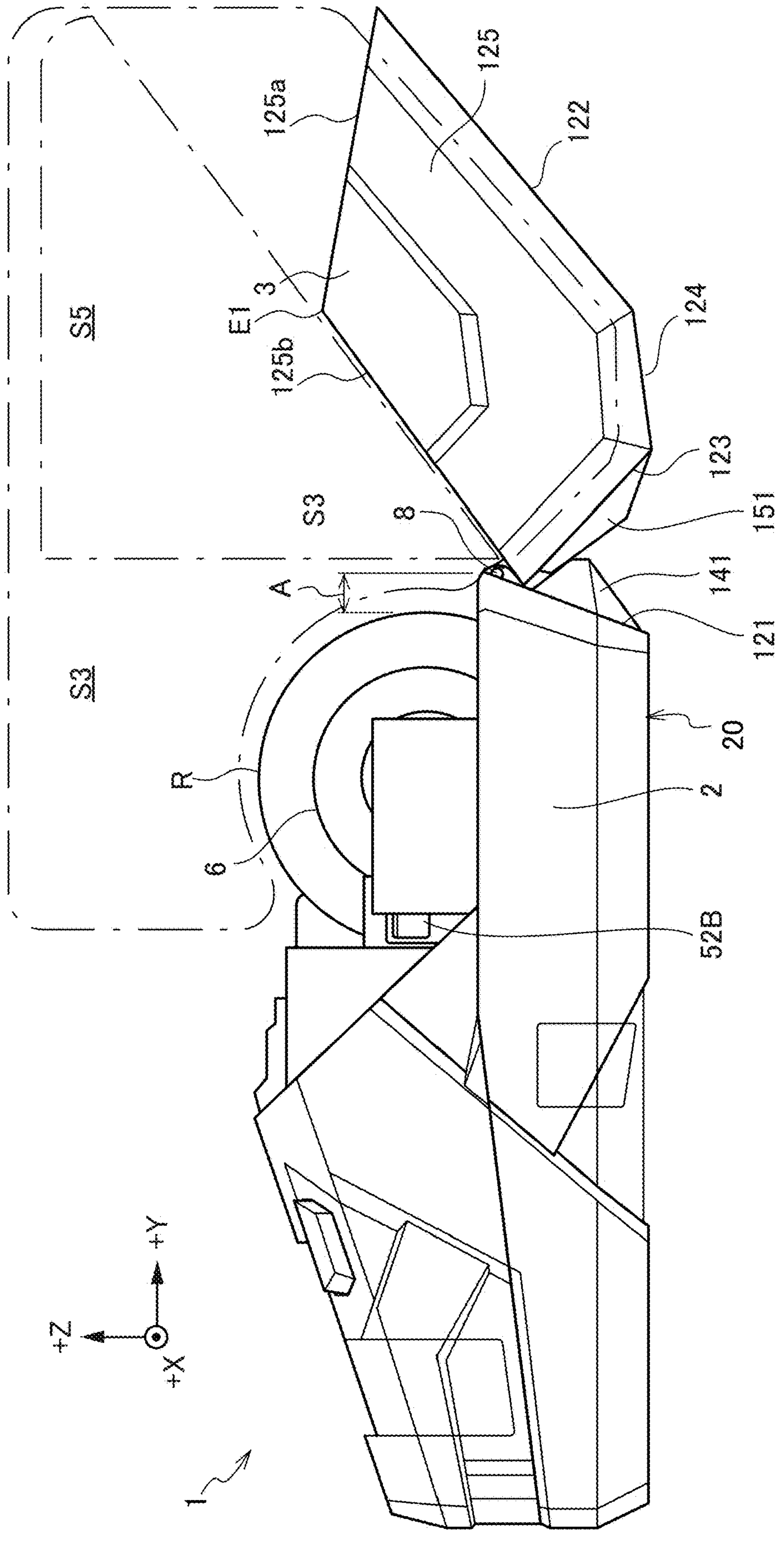
FIG. 9 is a side view of the printer according to an embodiment, with its printer cover open by the maximum open angle.

The printer cover 3 can be opened and closed about the axis of the hinge 8 between the closed position shown in FIG. 3 and the open position at the maximum open angle shown in FIG. 9. Here, the maximum open angle refers to the angle at which the printer cover 3 cannot further be rotated by cover-side buffer members 151 that is provided at the rear surface portion 123 of the printer cover 3. At the maximum open angle, the cover-side buffer members 151 abut on body-side buffer members 141 provided at the rear surface portion 121 of the body case 2.

As shown in FIG. 18, as seen in a side view, the printer cover 3 includes an upper surface portion 122, an inclined surface portion 124, and a rear surface portion 123. The inclined surface portion 124 and the upper surface portion 122 continue in this order, to the side of the rear surface portion 123 opposite to the hinge 8. As seen in the extending direction of the hinge 8 (i.e., in a side view), the rear surface portion 123 and the inclined surface portion 124 are connected at an obtuse interior angle (about 135 degrees). The inclined surface portion 124 and the upper surface portion 122 are connected at an obtuse interior angle (about 135 degrees). An angle between the rear surface portion 123 and the upper surface portion 122 is about 90 degrees. The upper surface portion 122, the inclined surface portion 124, and the rear surface portion 123 surround the roll body R accommodated in the roll body accommodating chamber 9. This structure reduces the size of the printer cover 3. As shown in FIG. 9, the inclined surface portion 124 becomes substantially horizontal when the printer cover 3 is opened by the maximum open angle. Provided that the inclined surface portion 124 does not exist and the upper surface portion 122 and the rear surface portion 123 are coupled directly to each other, an angle by which the boundary side between the upper surface portion 122 and the rear surface portion 123 abuts on the printer placement surface becomes the maximum open angle. In this case, the maximum open angle will be less than the maximum open angle of the open printer cover 3 shown in FIG. 9. Thus, the inclined surface portion 124 allows for increase of the maximum open angle.

Figure 19:
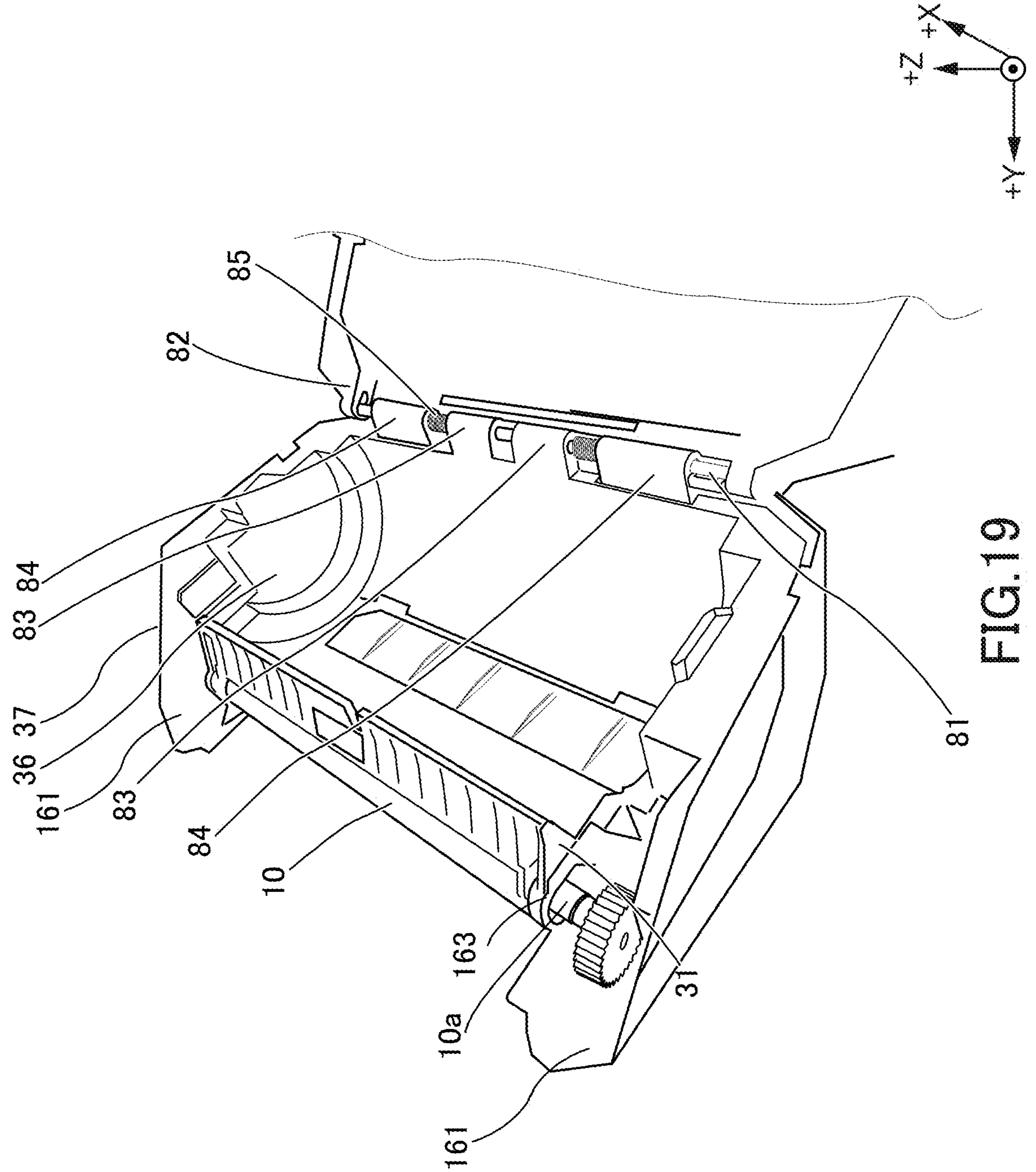
FIG. 19 is a perspective view of the printer according to an embodiment, showing a roll body accommodating chamber and the inner surface of the printer cover with its printer cover open.

As shown in FIG. 19, in an embodiment, the printer cover 3 has a two-layer structure comprised of an inner printer cover 36 and an outer printer cover 37 in view of toughness. The printer cover 3 is not specified to have such a double structure, and may be comprised of a single member.

(4) Hinge

The hinge 8 couples the printer cover 3 to the body case 2 to be capable of being opened and closed. That is, the hinge 8 couples the printer cover 3 with the body case 2 so that the printer cover 3 can swing about the hinge shaft 81 (described later) relative to the body case 2.

Figure 4:
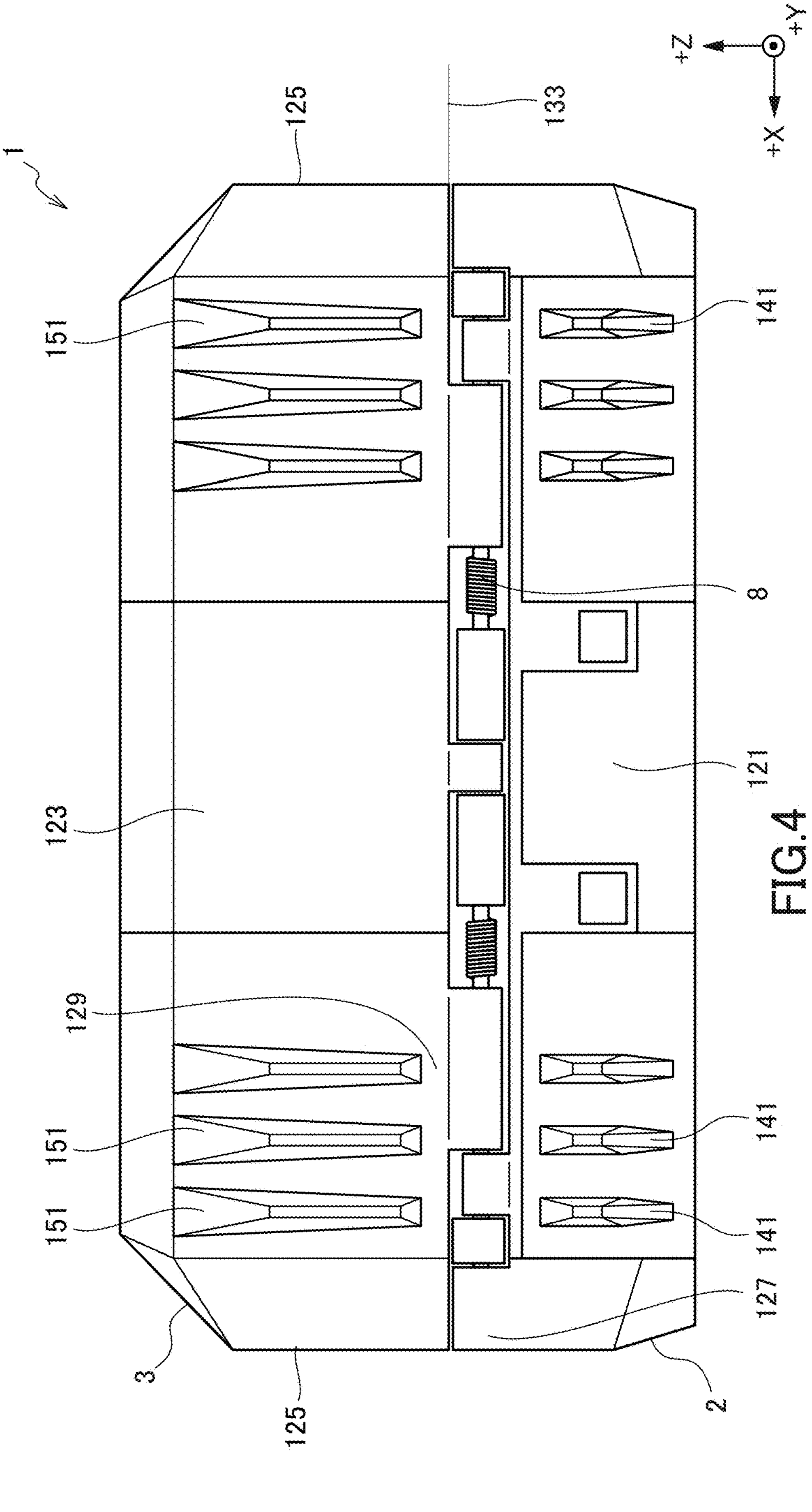
FIG. 4 is a rear view of the printer according to an embodiment, with its printer cover closed.

As shown in FIGS. 3 and 4, the hinge 8 rotatably couples the upper peripheral part 127 of the rear surface portion 121 of the body case 2 with the lower peripheral part 129 of the rear surface portion 123 of the printer cover 3. The hinge 8 extends in the lateral direction of the body case 2. Accordingly, the hinge 8 extends around the boundary between the upper peripheral part 127 of the rear surface portion 121 of the body case 2 and the lower peripheral part 129 of the rear surface portion 123 of the printer cover 3.

As shown in FIGS. 4 and 19, the hinge 8 includes the hinge shaft 81, body-side shaft-supporting long holes 82, inner printer cover-side shaft-supporting round holes 83, outer printer cover-side shaft-supporting round holes 84, and a torsion spring 85.

The pair of body-side shaft-supporting long holes 82 are provided at the right and left ends near the rear end of the roll body accommodating chamber 9. The body-side shaft-supporting long holes 82 have a long axis in the front-rear direction (i.e., Y-axis direction). Here, the long axis direction of the body-side shaft-supporting long holes 82 may be slightly displaced from the front-rear direction.

The pair of inner printer cover-side shaft-supporting round holes 83 are provided at the rear end of the inner printer cover 36.

The pair of the outer printer cover-side shaft-supporting round holes 84 are provided at the rear end of the outer printer cover 37.

The hinge shaft 81 is inserted through the pair of inner printer cover-side shaft-supporting round holes 83 and the pair of outer printer cover-side shaft-supporting round holes 84. The hinge shaft 81 has its both ends inserted into the pair of body-side shaft-supporting long holes 82.

The hinge shaft 81 extends in the lateral direction at the upper peripheral part 127 of the rear surface portion 121 of the body case 2. Accordingly, the body-side shaft-supporting long holes 82, the inner printer cover-side shaft-supporting round holes 83, and the outer printer cover-side shaft-supporting round holes 84 are also provided at the upper peripheral part 127 of the rear surface portion 121 of the body case 2. The inner printer cover-side shaft-supporting round holes 83 and the outer printer cover-side shaft-supporting round holes 84 of the printer cover 3 are positioned lower than a horizontal boundary line 133 (see FIGS. 3 and 4) between the body case 2 and the printer cover 3.

Figure 20:
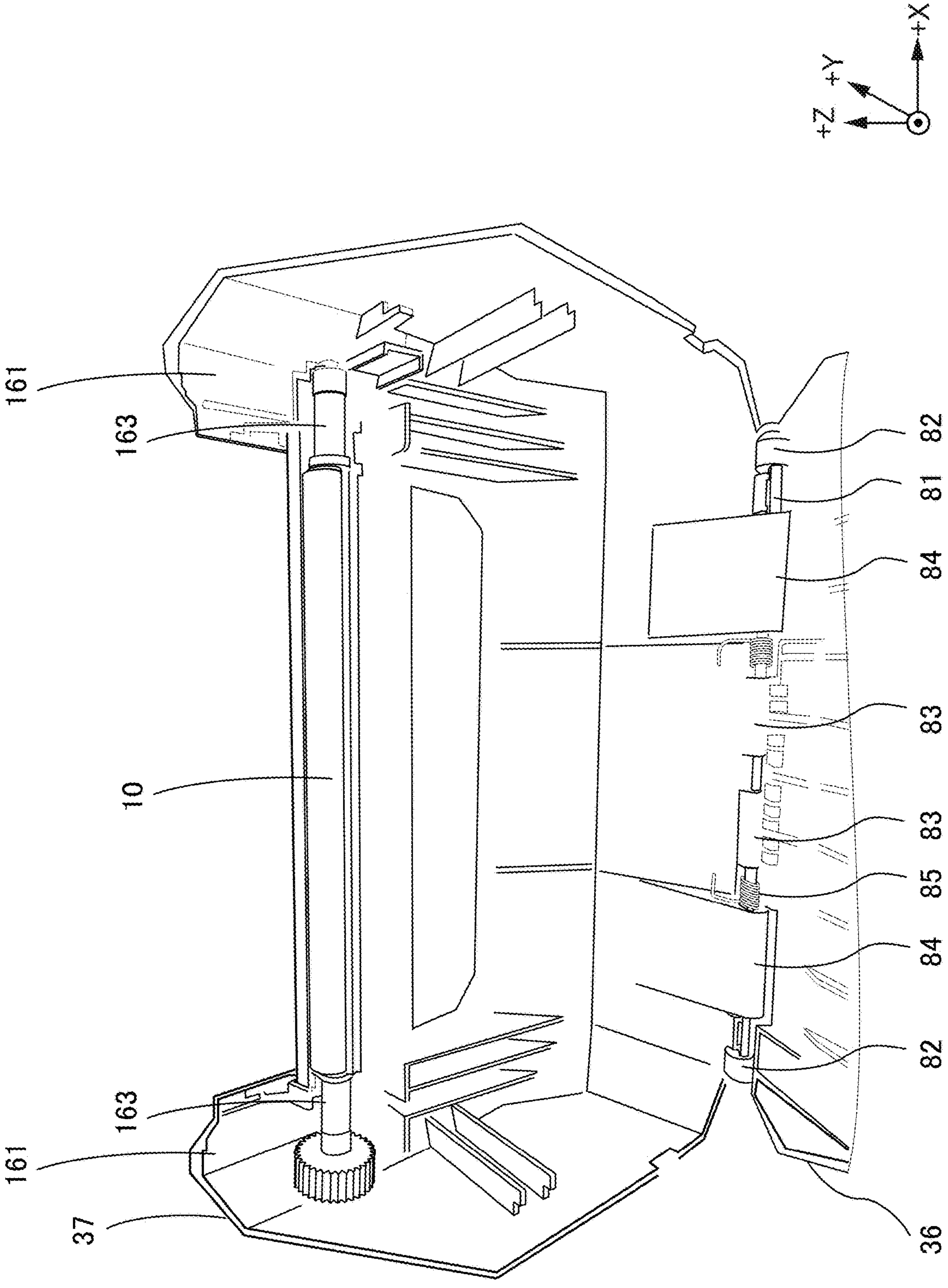
FIG. 20 is a perspective view of the printer according to an embodiment, showing the inner surface of an outer printer cover with its printer cover open.

While not shown in the drawings, the inner printer cover 36 and the outer printer cover 37 are integrated by being screwed to each other. When the inner printer cover 36 and the outer printer cover 37 are screwed, the inner printer cover 36 and the outer printer cover 37 can rotate about the hinge shaft 81 while being integrated. On the other hand, when the inner printer cover 36 and the outer printer cover 37 are not screwed, they can separately rotate about the hinge shaft 81. FIG. 19 shows the inner printer cover 36 and the outer printer cover 37 integrated by being screwed to each other. FIG. 20 shows the inner printer cover 36 and the outer printer cover 37 not being screwed but separated from each other.

Accordingly, when the hinge shaft 81 slides in the front-rear direction, the integrated inner printer cover 36 and outer printer cover 37 slide together in the front-rear direction. That is, when the hinge shaft 81 slides in the front-rear direction, the printer cover 3 slides in the front-rear direction.

The integrated inner printer cover 36 and outer printer cover 37 can rotate together about the hinge shaft 81. That is, the printer cover 3 can rotate about the hinge shaft 81.

The torsion spring 85 biases the printer cover 3 to open the closed printer cover 3.

The body-side shaft-supporting long holes 82 whose long axes are elongated in the front-rear direction allows the shaft of the hinge 8 to slide in the front-rear direction.

Note that, when the printer cover 3 has an integral structure instead of the double structure comprised of the inner printer cover 36 and the outer printer cover 37, not both the inner printer cover-side shaft-supporting round holes 83 and the outer printer cover-side shaft-supporting round holes 84 are required and one of them will suffice.

(5) Cover-Side Buffer Members and Body-Side Buffer Members

As shown in FIG. 4, in an embodiment, a plurality of body-side buffer members 141 are arranged in the lateral direction on the rear surface portion 121 of the body case 2. In the embodiment in FIG. 4, three body-side buffer members 141 are arranged in the lateral direction on each of the right and left sides of the rear surface portion 121 of the body case 2.

Similarly, in an embodiment, a plurality of cover-side buffer members 151 are arranged in the lateral direction on the rear surface portion 123 of the printer cover 3. In the embodiment in FIG. 4, three cover-side buffer members 151 are arranged in the lateral direction on each of the right and left sides of the rear surface portion 123 of the printer cover 3. The present invention is not limited thereto and a single body-side buffer members and a single cover-side buffer members may be provided.

In an embodiment, as shown in FIG. 4, the body-side buffer members 141 and the cover-side buffer members 151 are opposed to each other with reference to the hinge 8.

In the embodiment in FIG. 4, the body-side buffer members 141 and the cover-side buffer members 151 form pairs at the identical positions in the lateral direction.

Figure 5:
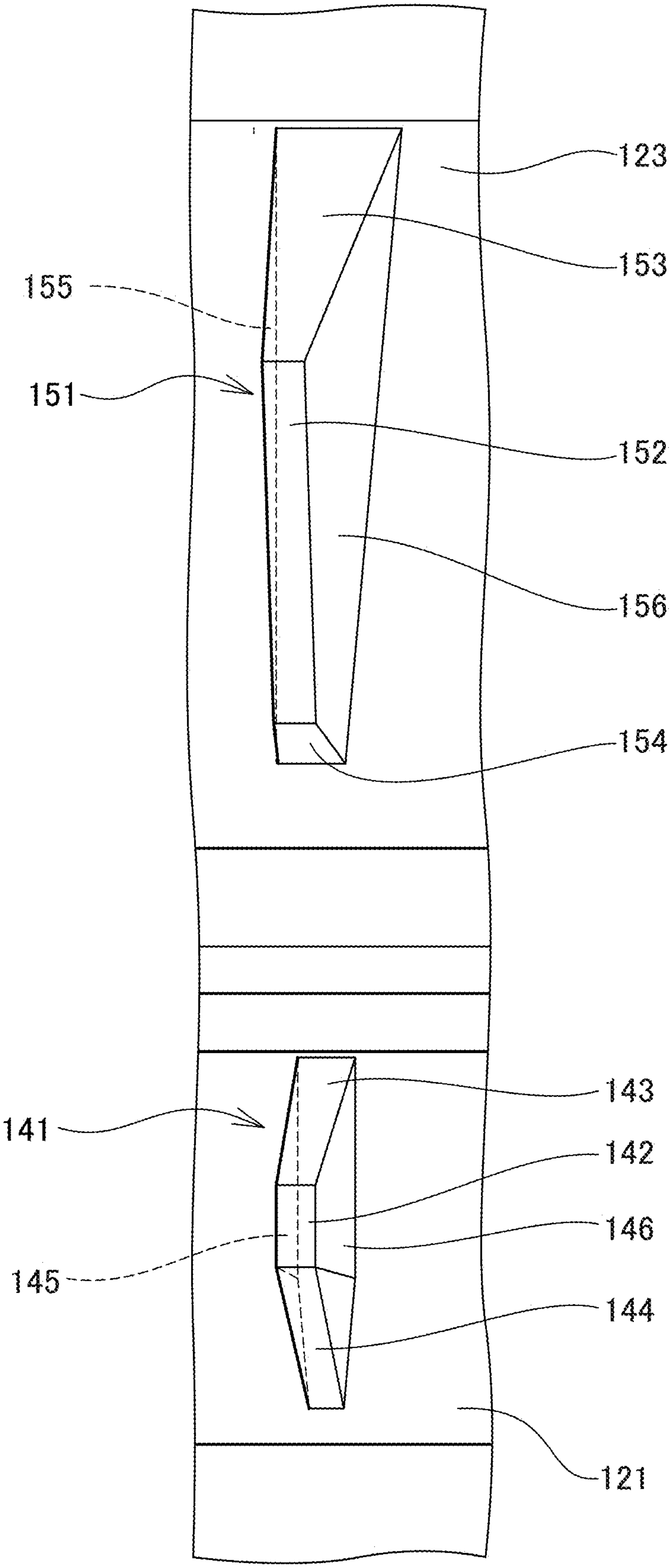
FIG. 5 is an enlarged partial perspective view showing the rear surface of the printer according to an embodiment, with its printer cover closed.

FIG. 5 is an enlarged partial view corresponding to FIG. 4. As shown in FIG. 5, in an embodiment, the body-side buffer members 141 each include a total of five surfaces, i.e., a tip surface 142, an upper surface 143, a lower surface 144, a left surface 145, and a right surface 146. Similarly, the cover-side buffer members 151 each include a total of five surfaces, i.e., a tip surface 152, an upper surface 153, a lower surface 154, a left surface 155, and a right surface 156.

(6) Non-Interference Between Printer Cover and Body Case 2

Figure 12:
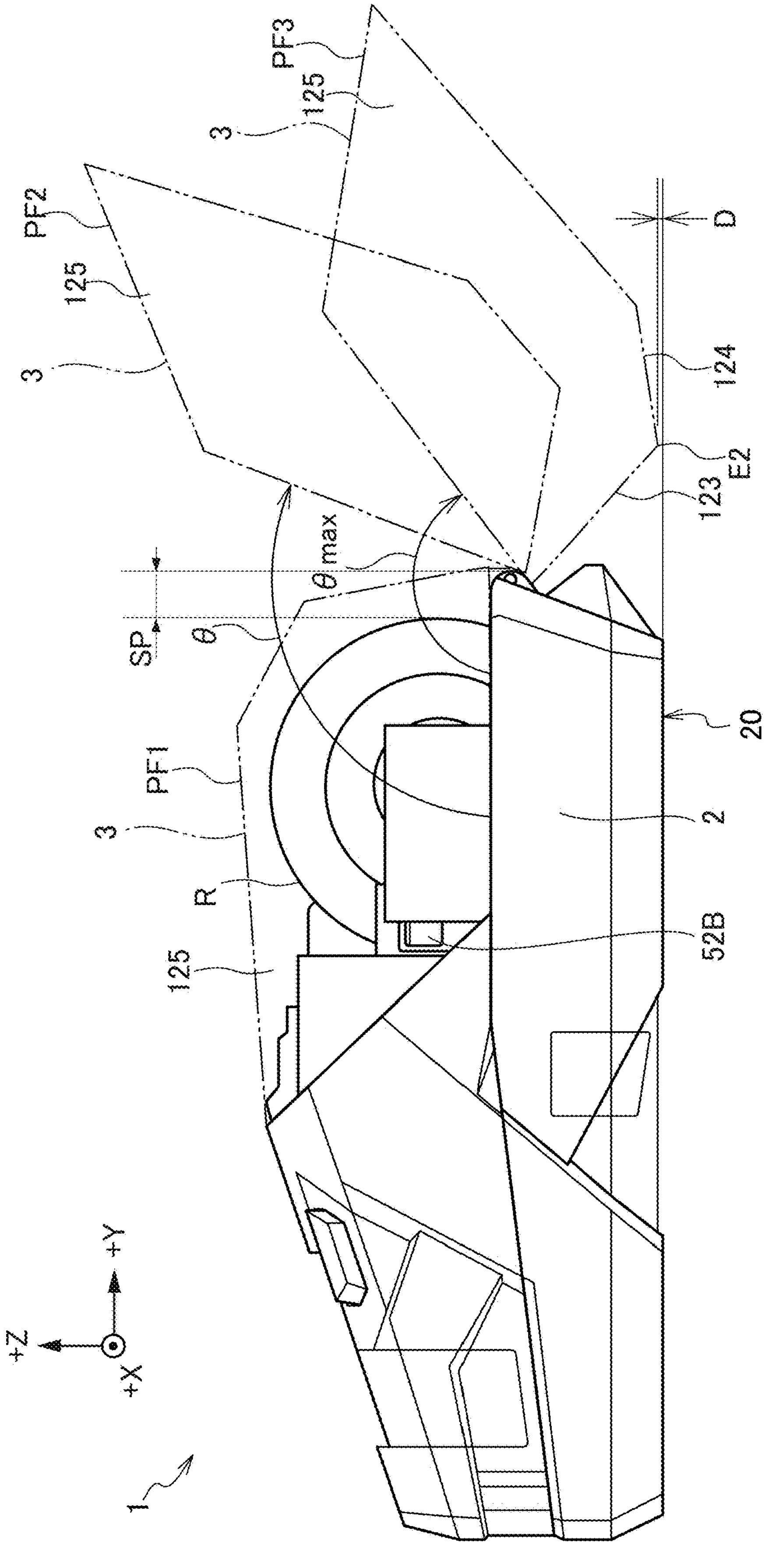
FIG. 12 shows the printer according to an embodiment, with its printer cover closed, open by an open angle less than the maximum open angle, and open by the maximum open angle.

As shown in FIG. 12, in the open angle range from the angle of the printer cover 3 at the closed position (where the printer cover 3 has a profile PF1) to the maximum open angle (where the printer cover 3 has a profile PF3), the printer cover 3 does not interfere with the body case 2.

(7) Printer Cover being Closed

The profile PF1 shown in FIG. 12 is a profile of the printer cover 3 at the closed position (where the open angle is zero degrees).

When the printer cover 3 is at the closed position, as seen in a side view, the roll body R is covered with the body case 2 and the printer cover 3 so that the roll body R set in the printer 1 partially overlaps with the printer cover 3.

As shown in FIG. 1B, it is apparent that the printer cover 3 partially covers part of the roll body R set in the printer 1 as seen from the rear projection plane irrespective of the open angle of the printer cover 3.

Accordingly, as shown in FIGS. 1B and 12, when the printer cover 3 is at the closed position, the printer cover 3 partially covers at least part of the roll body R set in the printer 1 as seen from any of the upper projection plane, the side projection plane, and the rear projection plane. Thus, the printer cover 3 covers, with a gap, the roll body R set in the printer 1, from above, both sides, and behind.

Figure 6:
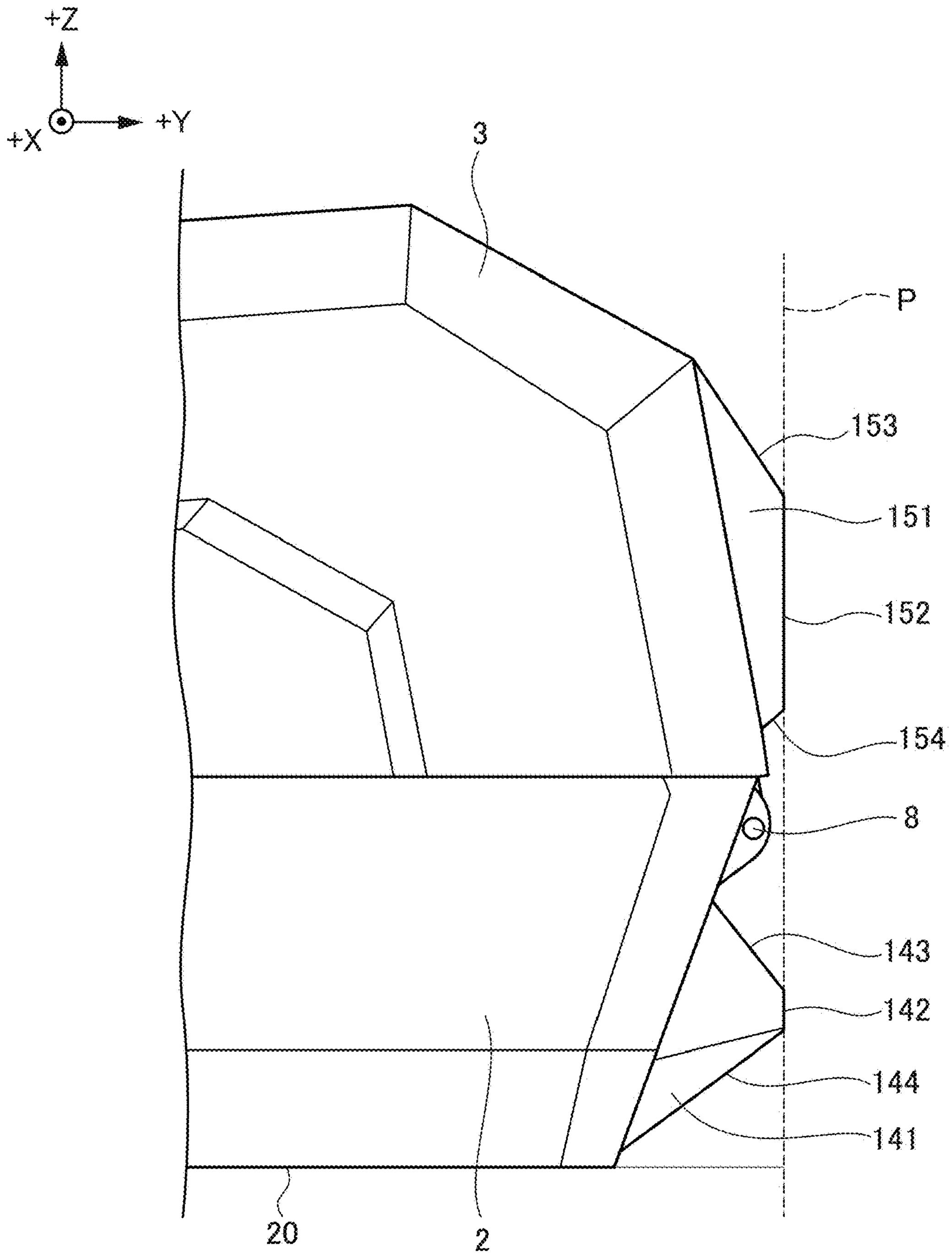
FIG. 6 is an enlarged partial side view of the printer according to an embodiment, with its printer cover closed.
Figure 7:
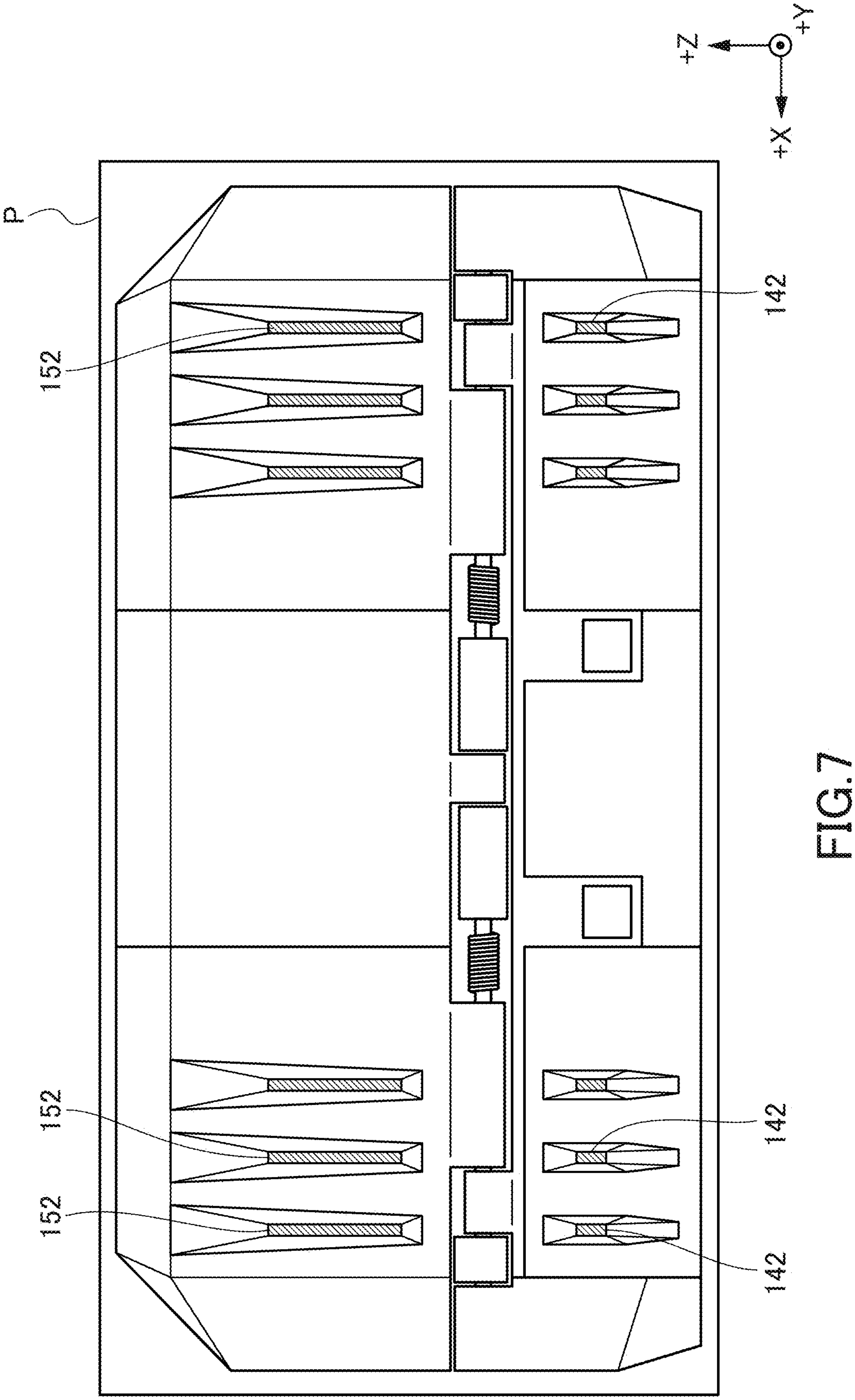
FIG. 7 is a second rear view of the printer according to an embodiment, with its printer cover closed.

In an embodiment, as shown in FIGS. 6 and 7, when the printer cover 3 is at the closed position, the end surfaces 152 of the cover-side buffer members 151 and the end surfaces 142 of the body-side buffer members 141 are on an identical plane P. The plane P is perpendicular to the placement surface 20 for the printer 1 to be placed upright.

No components or parts are disposed in the printer 1 behind the plane P. Specifically, the rear surface portion 121 of the body case 2 is positioned on the front side of the body case than the plane P. The rear surface portion 123 of the printer cover 3 is positioned on the front side of the body case than the plane P. The hinge 8 is positioned on the front side of the body case than the plane P. Other portions or components of the printer 1 are also positioned on the front side of the body case than the plane P.

Thus, the end surfaces 152 of the cover-side buffer members 151 and the end surfaces 142 of the body-side buffer members 141 function as the bottom surfaces when the printer 1 is placed upright.

(8) Printer Cover being Open by Open Angle of Less than Maximum Open Angle

Figure 8:
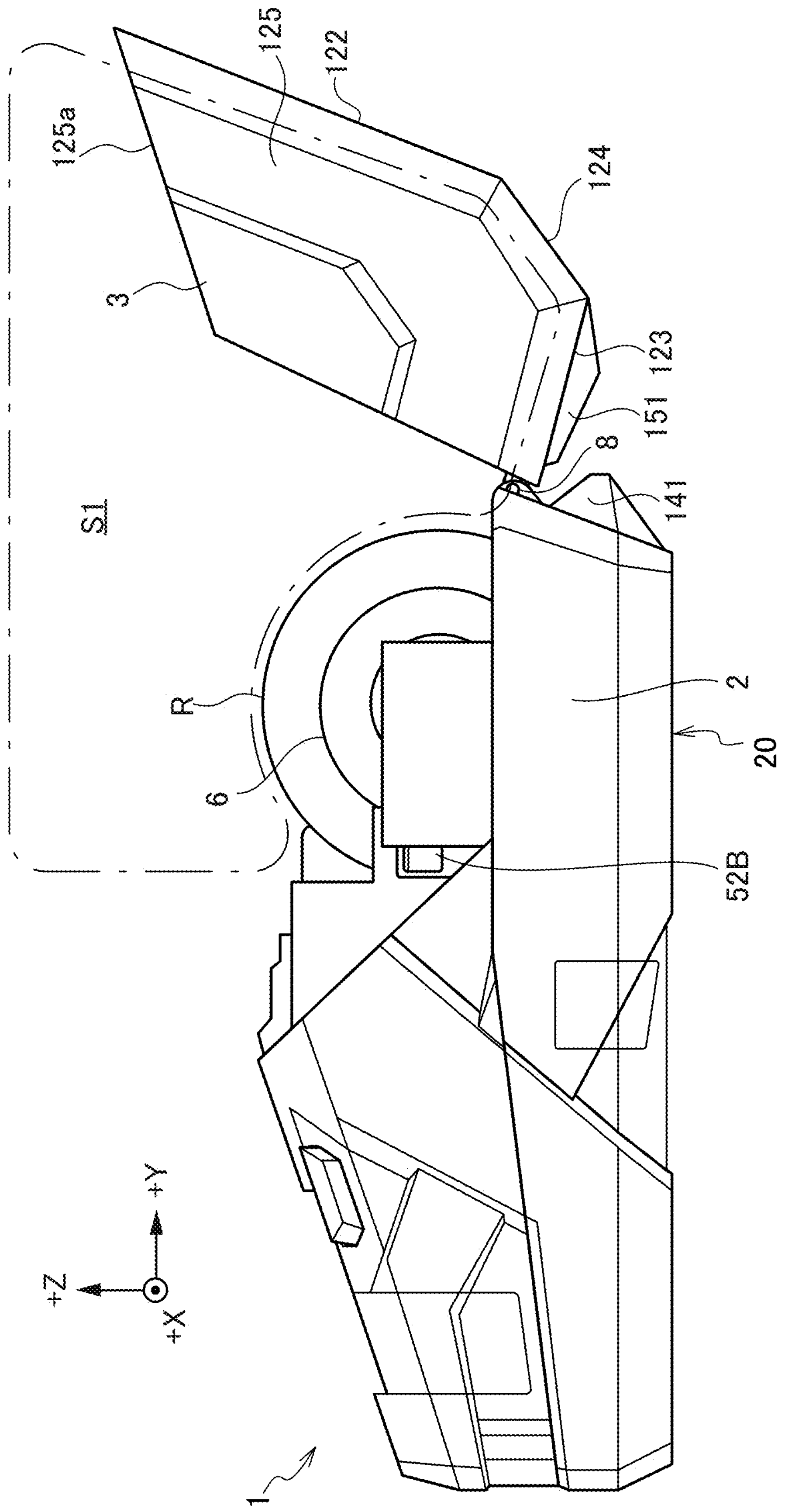
FIG. 8 is a side view of the printer according to an embodiment, with its printer cover open by an open angle less than the maximum open angle.

FIG. 8 is a side view of the printer 1 with the printer cover 3 open by an open angle less than the maximum open angle.

When the printer cover 3 is open at an open angle less than the maximum open angle, the cover-side buffer members 151 do not abut on the body-side buffer members 141.

As shown in FIG. 8, when the printer cover 3 is open at an open angle less than the maximum open angle, open space S1 is formed above the entire roll body R. In the front-rear direction, the open space S1 extends to the region surrounded by the upper surface portion 122, the inclined surface portion 124, the rear surface portion 123, and the pair of side surface portions 125 of the printer cover 3 that is open rearward over the hinge 8.

Figure 21:
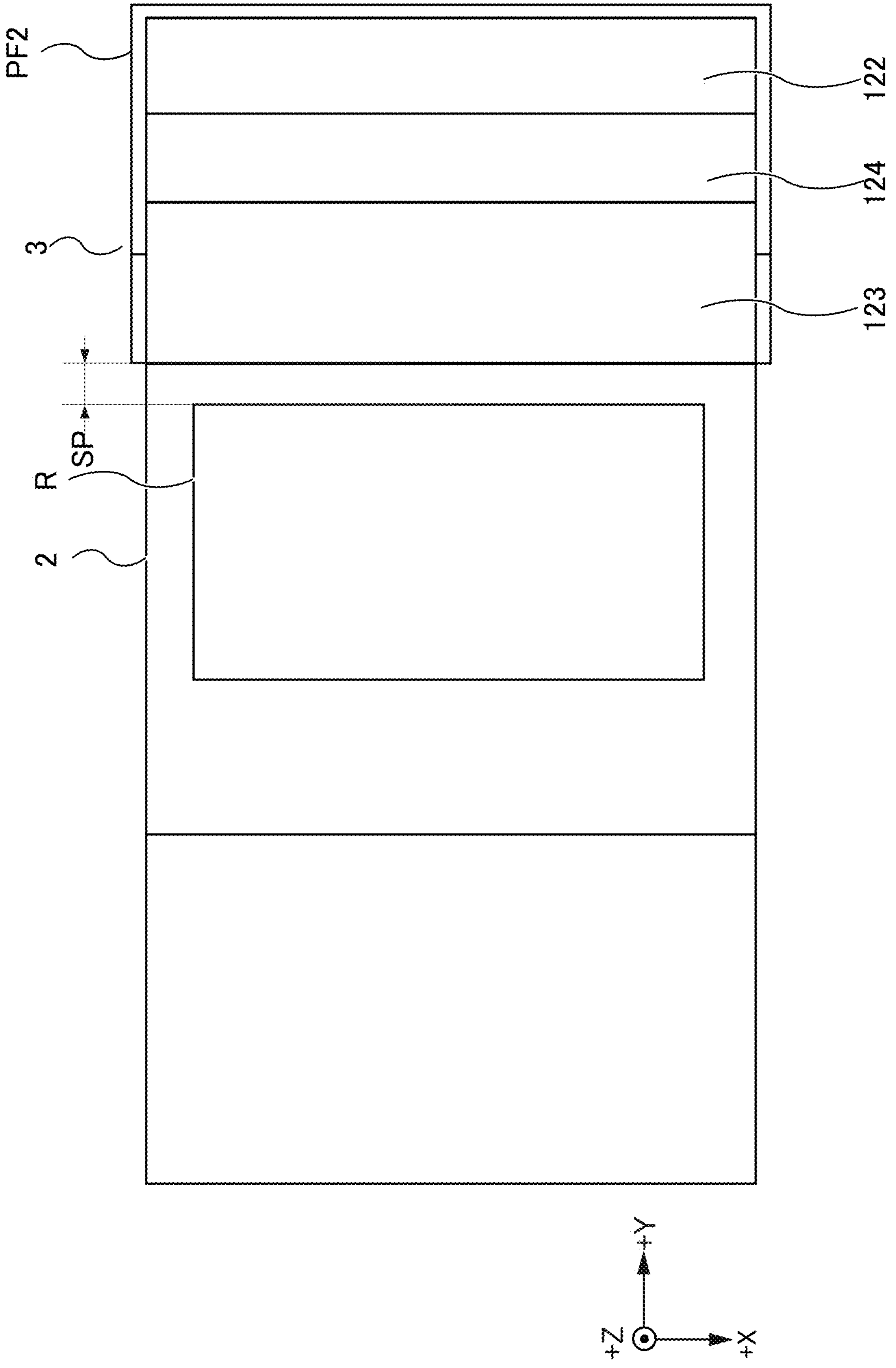
FIG. 21 is a top view of the printer according to an embodiment, showing the roll body accommodating chamber and the inner surface of the printer cover with its printer cover open by an open angle less than the maximum open angle.

FIGS. 12 and 21 show a profile PF2 in a side view and a top view of the printer cover 3, respectively, at the open position corresponding to an open angle θ less than the maximum open angle.

As shown in FIG. 12, in a side view, space of a distance SP exists between the roll body R set in the printer 1 and the side surface portions 125 of the printer cover 3. As shown in FIG. 21, in a top view, space of a distance SP exists between the roll body R set in the printer 1 and the rear surface portion 123 of the printer cover 3.

(9) Printer Cover being Open by Maximum Open Angle

FIG. 9 is a side view of the printer 1 with the printer cover 3 open by the maximum open angle.

When the printer cover 3 is open at the maximum open angle, as seen in a side view, part of the roll body R is exposed. As used herein, part of the roll body R refers to the portion of the roll body R set in the printer 1 that overlaps with the printer cover 3 as seen in a side view when the printer cover 3 is at the closed position. For example, as shown in FIGS. 1A, 1B, and 2, the exposed part of the roll body R is the portion higher than the height of the lower end of the core 7 of the roll body R set in the printer 1 by the roll body guides 6.

When the printer cover 3 is at the closed position, as seen in a side view, the roll body guides 6 overlap with the printer cover 3. When the printer cover 3 is open at the maximum open angle, the roll body guides 6 are exposed. Accordingly, by opening the printer cover 3 by the maximum open angle, the user can readily remove the roll body R from the roll body guides 6 or set a new roll body R on the roll body guides 6.

When the printer cover 3 at the closed position is opened to gradually increase the open angle, the cover-side buffer members 151 abut on the body-side buffer members 141 where the open angle cannot be increased further. This open angle is the maximum open angle where the printer cover 3 is in the fully open position.

As shown in FIG. 9, when the printer cover 3 is open at the maximum open angle, open space S3 is formed above the entire roll body R. In the front-rear direction, the open space S3 extends to the region surrounded by the upper surface portion 122, the inclined surface portion 124, the rear surface portion 123, and the pair of side surface portions 125 of the printer cover 3 that is open rearward over the hinge 8.

As compared to the open space S1 shown in FIG. 8, the open space S3 shown in FIG. 9 is greater by a portion S5 that occurs by the difference in the open angle of the printer cover 3.

As shown in FIG. 9, two ends E1 (portions where the front sides 125*a* and the lower sides 125*b* of the side surface portions 125 are joined to each other on the right and left sides), which become the highest ends of the printer cover 3 when the printer cover 3 is open at the maximum open angle, are lower than the top of the roll body R.

Accordingly, the user can set the roll body R in the roll body accommodating chamber 9 from above within a considerably wider range. That is, the roll body R can be set in the roll body accommodating chamber 9 not just from directly above but also from above in a relatively angled manner.

Alternatively, the user can remove the roll body R accommodated in the roll body accommodating chamber 9 upward within a considerably wider range. That is, the roll body R accommodated in the roll body accommodating chamber 9 can be removed not just toward directly above but also toward above in a relatively angled manner.

If the roll body R has been set in the roll body accommodating chamber 9 in the wrong orientation, the user can easily correct the orientation of the roll body R by: grasping radially externally the sides of the roll body R; removing the roll body R from the pair of roll body guides 6; reversing the orientation of the roll body R; and setting the roll body R on the pair of roll body guides 6.

Figure 10:
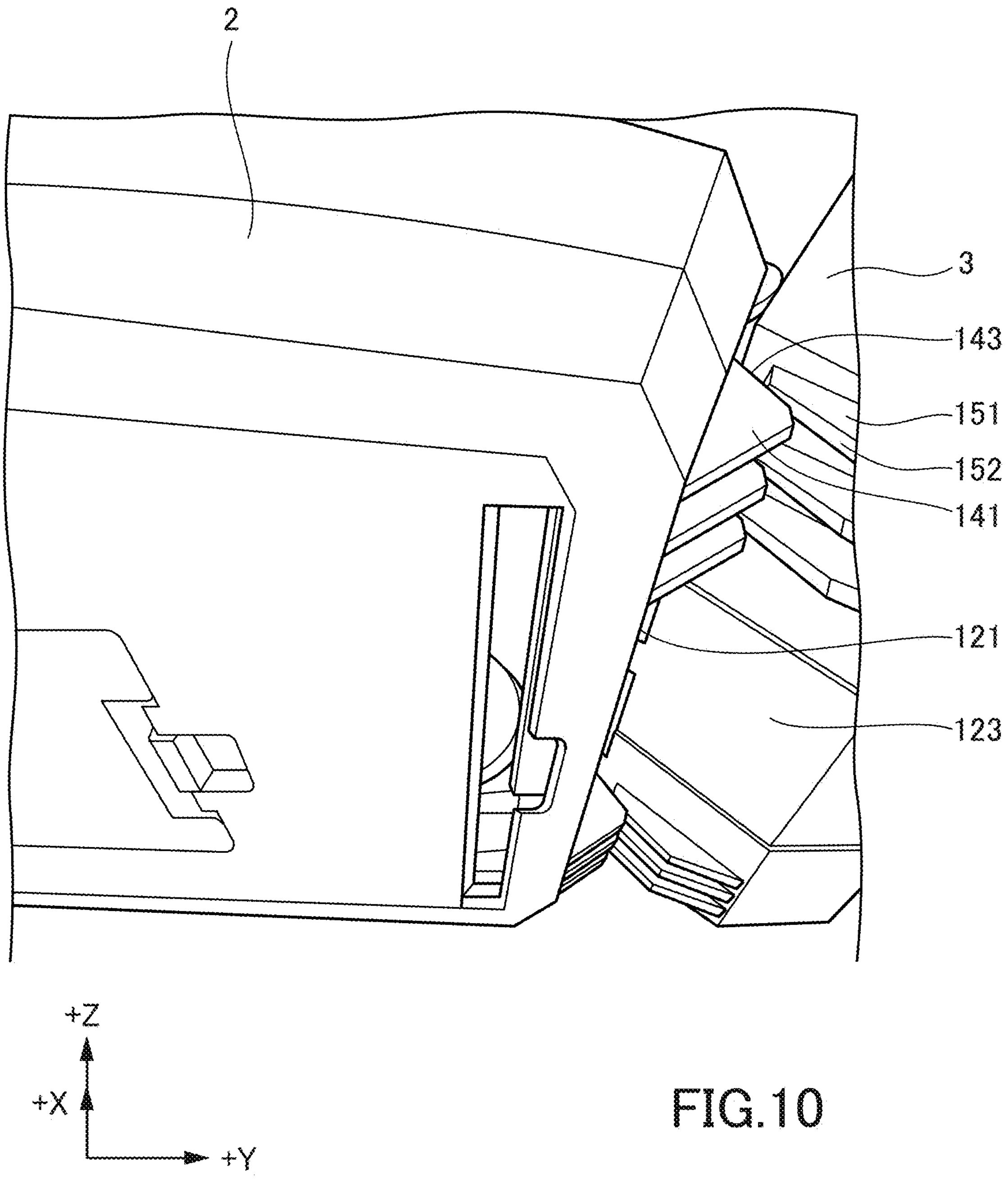
FIG. 10 is a perspective view of the printer according to an embodiment, showing its rear, bottom, and left faces with its printer cover open by the maximum open angle.
Figure 11:
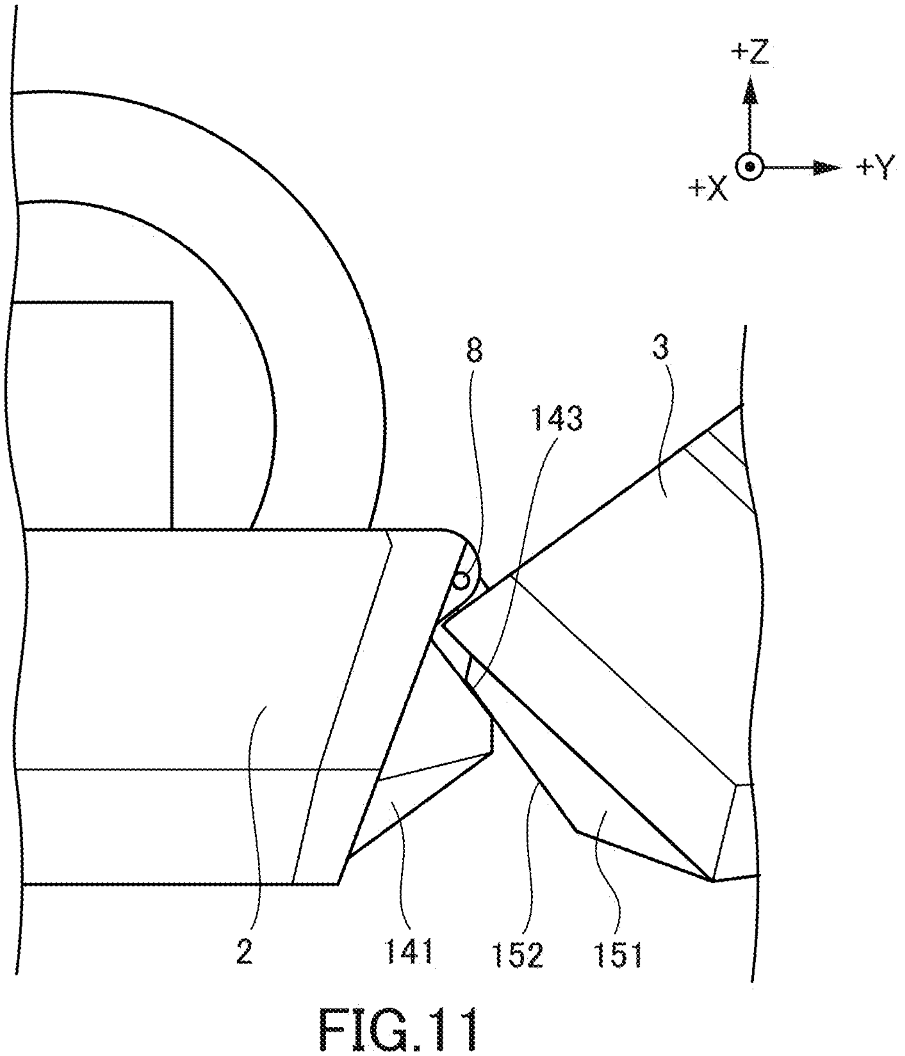
FIG. 11 is an enlarged partial side view of the printer according to an embodiment, with its printer cover open by the maximum open angle.

Specifically with reference to FIGS. 10 and 11, the end surfaces 152 of the cover-side buffer members 151 abuts on the upper surfaces 143 of the body-side buffer members 141, thereby causing the open angle of the printer cover 3 to be the maximum open angle. Here, as seen in a side view, part of the cover-side buffer members 151 is disposed frontward than the rear ends of the body-side buffer members 141, and the upper surfaces 143 of the body-side buffer members 141 and the end surfaces 152 of the cover-side buffer members 151 abut on each other. Accordingly, the maximum open angle becomes greater as compared to the case where part of the cover-side buffer members 151 is not disposed frontward than the rear ends of the body-side buffer members 141.

The upper surfaces 143 of the body-side buffer members 141, which abut on the cover-side buffer members 151 when the printer cover 3 is open, are not the end surfaces 142 of the body-side buffer members 141 on the plane P in FIG. 6. The end surfaces 152 of the cover-side buffer members 151, which abut on the body-side buffer members 141 when the printer cover 3 is open, are on the plane P in FIG. 6 as described above (see FIG. 6).

Figure 22:
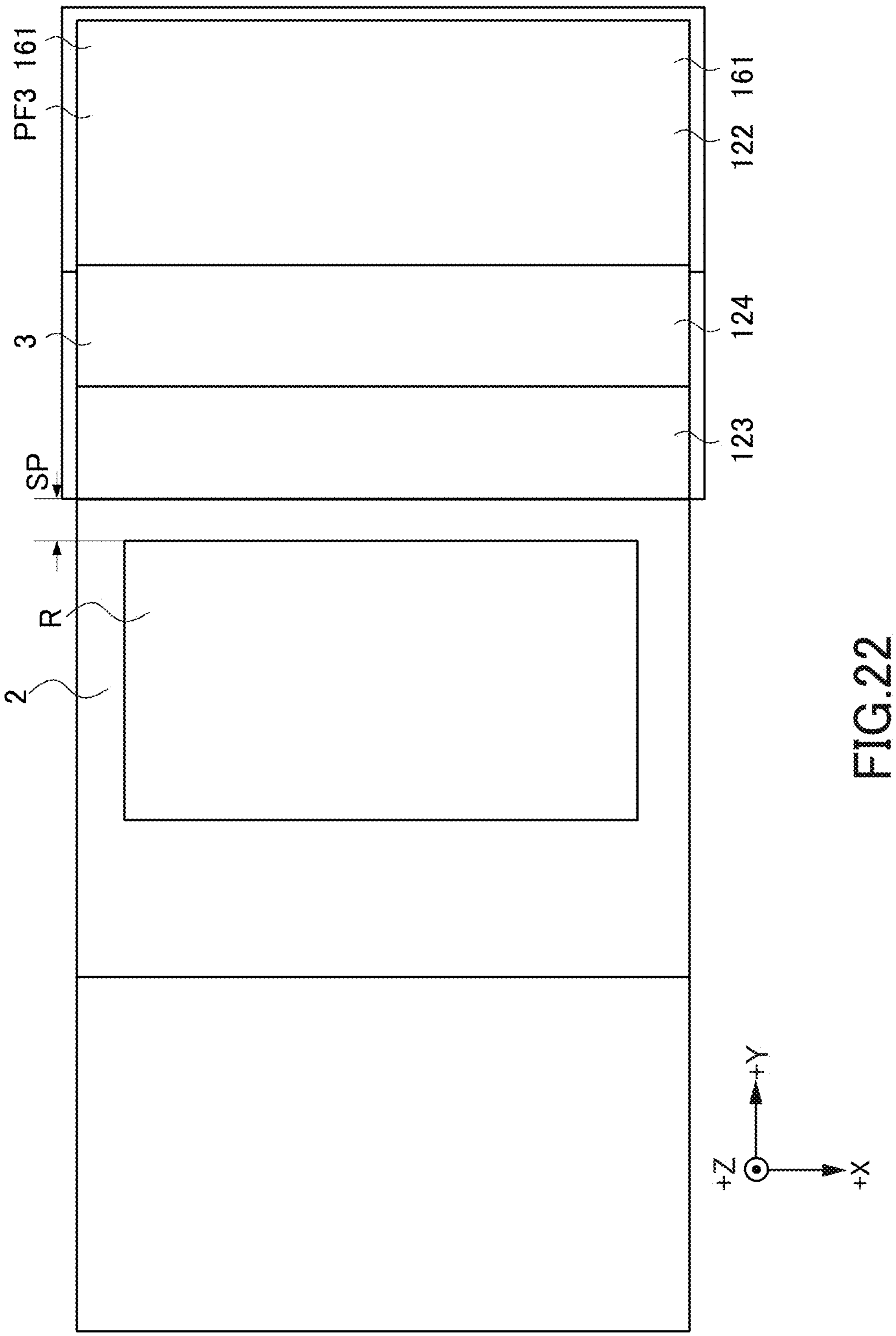
FIG. 22 is a top view of the printer according to an embodiment, showing the roll body accommodating chamber and the inner surface of the printer cover with its printer cover open by the maximum open angle.

FIGS. 12 and 22 show the profile PF3 in a side view and a top view of the printer cover 3, respectively, at the open position corresponding to the maximum open angle θmax.

As shown in FIG. 12, in a side view, space of a distance SP exists between the roll body R set in the printer 1 and the side surface portions 125 of the printer cover 3. As shown in FIG. 22, as also seen from above, space of a distance SP exists between the roll body R set in the printer 1 and the rear surface portion 123 of the printer cover 3.

As shown in FIGS. 19 and 22, the front inner surface portion 161 is oriented upward so that the platen roller 10 is set on or detached from the attachment part 163 from above. Accordingly, by opening the printer cover 3 by the maximum open angle, the platen roller 10 can easily be set on or detached from the attachment part 163 from above.

As shown in FIG. 12, in an embodiment, a distance D falls within a range of zero to a predetermined distance. The distance D is a distance from a ridge part E2, which corresponds to the lower end of the printer cover 3 when the printer cover 3 is open at the maximum open angle, to the placement plane on which the printer 1 is placed. The ridge part E2 is the portion where the rear surface portion 123 and the inclined surface portion 124 are joined to each other. Here, the predetermined distance is very short, e.g., several percentages, relative to the distance from the placement plane on which the printer 1 is placed to the horizontal boundary line 133 of the printer cover 3 (see FIGS. 3 and 4). That is, the maximum open angle can be set so that the printer cover 3 is opened until the distance from the placement plane on which the printer 1 is placed to the portion corresponding to the lower end of the printer cover 3 (i.e., the ridge part E2) becomes very short.

(10) Shape of Rear Surface Portion and Buffer Members

The following discussion relates to the effects on the open angle of the printer cover by the shape and dimension of the printer cover, the body case, and the buffer members, and the hinge position.

FIGS. 13A to 13F show how the maximum open angle varies depending on the height of the body case and the height of the printer cover.

Figure 13A:
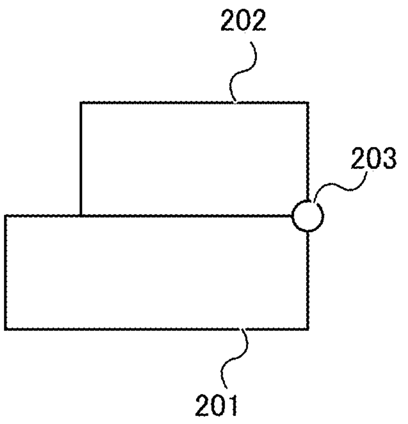
FIGS. 13A to 13F are schematic explanatory illustrations about the open angle of the printer cover.
Figure 13B:
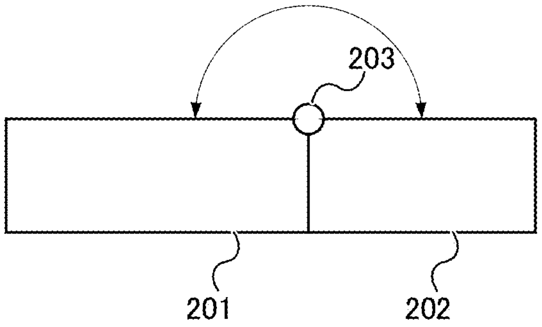
Figure 13C:
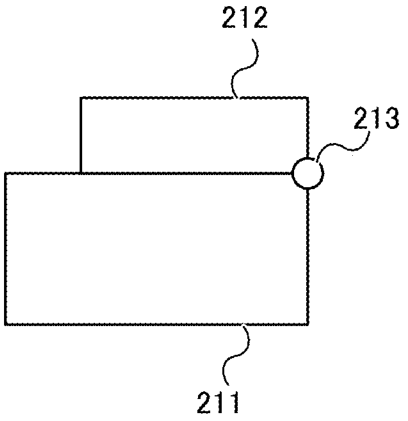
Figure 13D:
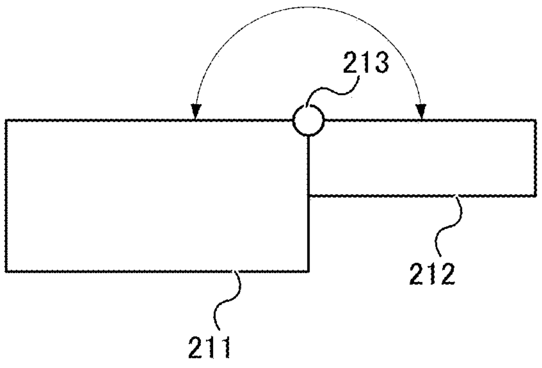
Figure 13E:
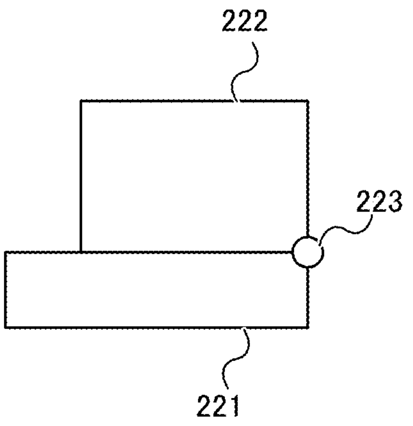
Figure 13F:
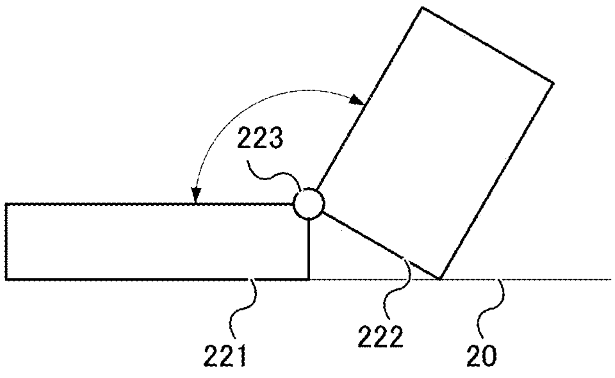

FIG. 13A is a side view of a comparative example 1 with its printer cover closed. FIG. 13B is a side view of the comparative example 1 with its printer cover open by the maximum open angle. FIG. 13C is a side view of a comparative example 2 with its printer cover closed. FIG. 13D is a side view of the comparative example 2 with its printer cover open by the maximum open angle. FIG. 13E is a side view of a comparative example 3 with its printer cover closed. FIG. 13F is a side view of the comparative example 3 with its printer cover open by the maximum open angle.

In the structure of the comparative examples 1 to 3, it is assumed that the rear surface portion of the body case and the rear surface portion of the printer cover are vertical, and the hinge couples the lower peripheral part of the rear surface portion of the printer cover with the upper peripheral part of rear surface portion of the body case so that the printer cover can be opened and closed.

The comparative example 1 shown in FIGS. 13A and 13B shows that, when the height of a body case 201 and the height of a printer cover 202 is identical to each other, the printer cover 202 can be opened at 180 degrees about a hinge 203.

The comparative example 2 shown in FIGS. 13C and 13D shows that, when the height of a body case 211 is higher than the height of a printer cover 212, the printer cover 212 can be opened at 180 degrees about a hinge 213.

The comparative example 3 shown in FIGS. 13E and 13F shows that, when the height of a body case 221 is lower than the height of a printer cover 222, the printer cover 222 will abut on the placement surface 20 of the printer before the printer cover 222 is opened at 180 degrees about a hinge 223.

FIGS. 14A to 14F show how maximum open angle varies depending on the mounting position of the hinge in the front-rear direction.

Figure 14A:
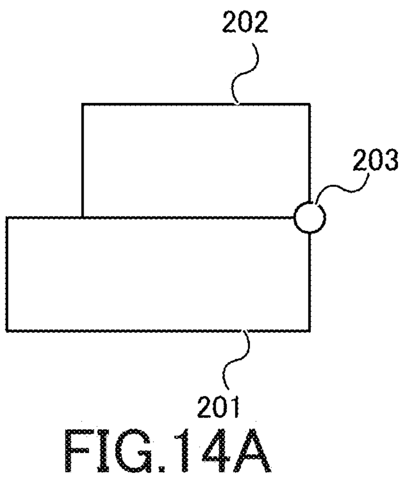
FIGS. 14A to 14F are schematic explanatory illustrations about the open angle of the printer cover.
Figure 14B:
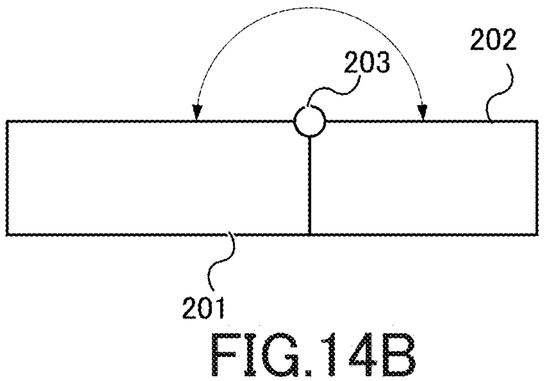
Figure 14C:
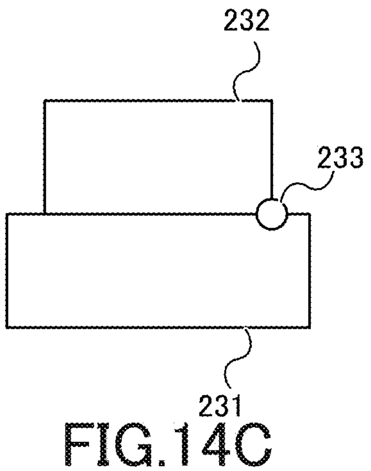
Figure 14D:
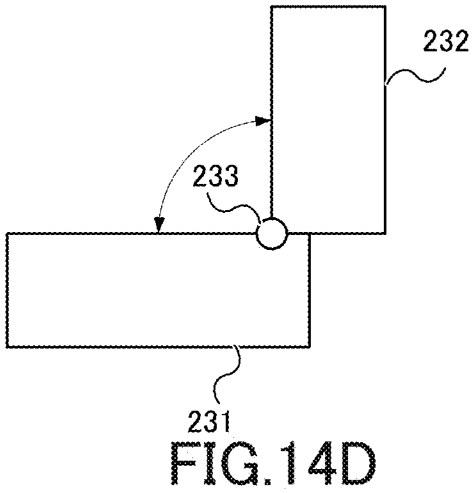
Figure 14E:
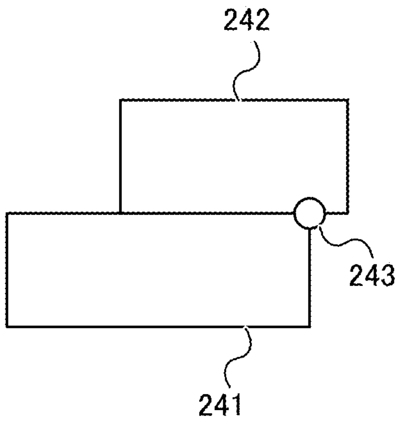
Figure 14F:
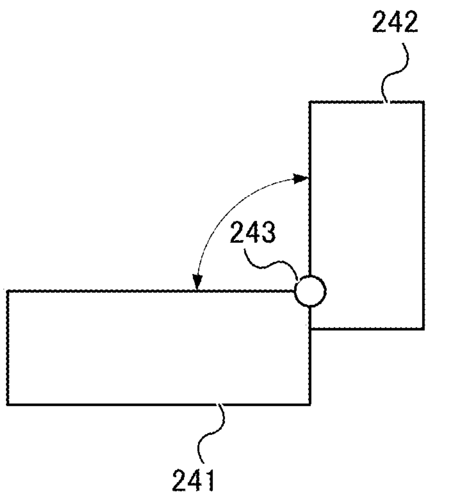

FIG. 14A is a side view of the comparative example 1 with its printer cover closed. FIG. 14B is a side view of the comparative example 1 with its printer cover open at the maximum open angle. FIG. 14C is a side view of a comparative example 4 with its printer cover closed. FIG. 14D is a side view of the comparative example 4 with its printer cover open at the maximum open angle. FIG. 14E is a side view of a comparative example 5 with its printer cover closed. FIG. 14F is a side view of the comparative example 5 with its printer cover open at the maximum open angle.

In the structures of the comparative examples 1, 4, 5, it is assumed that the rear surface portion of the body case and the rear surface portion of the printer cover are vertical, and the height of the body case and the height of the printer cover are identical.

The comparative example 1 shown in FIGS. 14A and 14B shows that, when the hinge 203 is at the rearmost end of the upper side of the body case 201 and the rearmost end of the lower side of the printer cover 202, the printer cover 202 can be opened at 180 degrees about the hinge 203. FIGS. 14A and 14B are identical to FIGS. 13A and 13B, respectively.

The comparative example 4 shown in FIGS. 14C and 14D shows that, when a hinge 233 is positioned frontward than the rearmost end of the upper side of a body case 231 and the rearmost end of the lower side of a printer cover 232, the printer cover 232 can be rotated only by 90 degrees about the hinge 233.

The comparative example 5 shown in FIGS. 14E and 14F shows that, when a hinge 243 is positioned frontward than the rearmost end of the upper side of a body case 241 and the rearmost end of the lower side of the printer cover 242, the printer cover 242 can be opened by only 90 degrees about the hinge 243.

Accordingly, in order for the printer cover to rotate by 180 degrees, the height of the printer cover must be identical to or higher than that of the body case, and the hinge must be disposed rearmost in the upper side of the body case and in the lower side of the printer cover.

Next, the following discussion relates to cases where the rear surface portion of the body case and the rear surface portion of the printer cover are respectively provided with the body-side buffer members and the cover-side buffer members, in view of the printer being disposed upright.

FIGS. 15A to 15F show how the maximum open angle varies depending on the shape of the body-side buffer members and the cover-side buffer members.

Figure 15A:
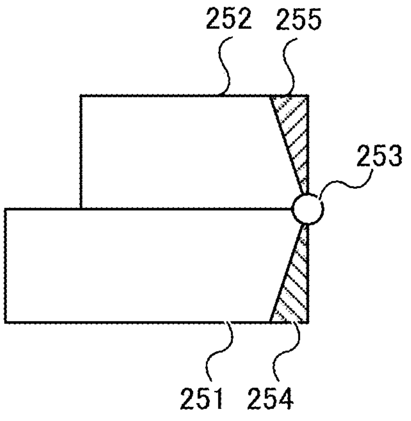
FIGS. 15A to 15F are schematic explanatory illustrations about the open angle of the printer cover.
Figure 15B:
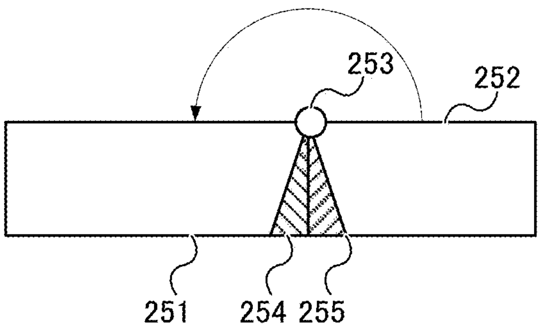
Figure 15C:
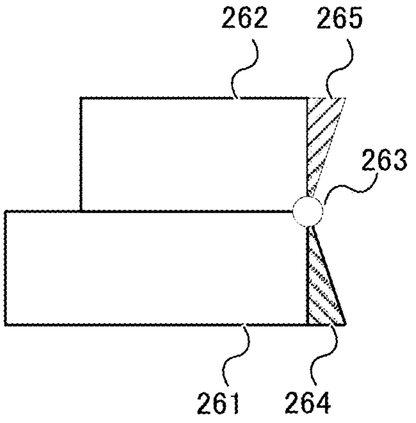
Figure 15D:
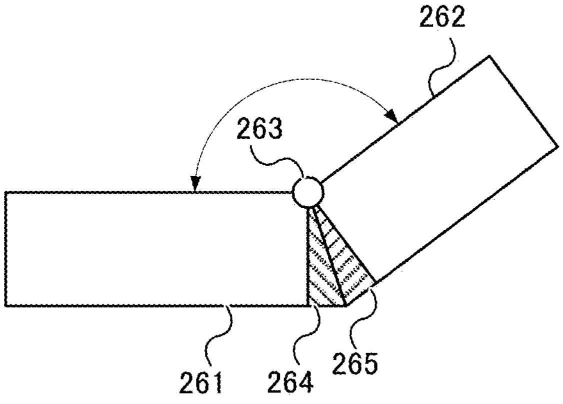
Figure 15E:
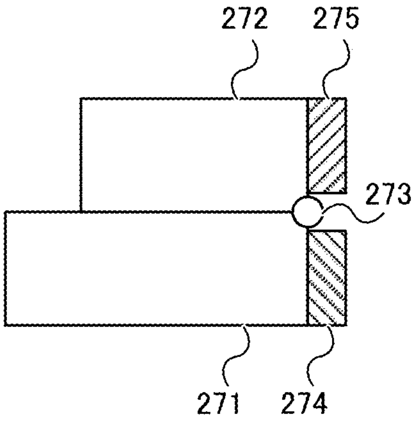
Figure 15F:
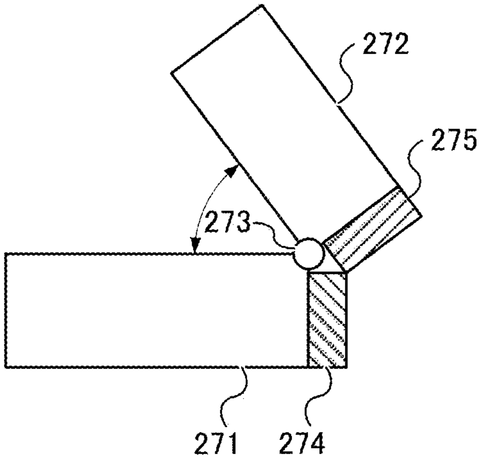

FIG. 15A is a side view of a comparative example 6 with its printer cover closed. FIG. 15B is a side view of the comparative example 6 with its printer cover open at the maximum open angle. FIG. 15C is a side view of a comparative example 7 with its printer cover closed. FIG. 15D is a side view of the comparative example 7 with its printer cover open at the maximum open angle. FIG. 15E is a side view of a comparative example 8 with its printer cover closed. FIG. 15F is a side view of the comparative example 8 with its printer cover open at the maximum open angle.

In the structures of the comparative examples 6 to 8, it is assumed that the height of the printer cover of the body case is identical.

As shown in FIGS. 15A and 15B, in the comparative example 6, body-side buffer members 254 are provided at the rear surface portion of a body case 251 and cover-side buffer members 255 are provided at the rear surface portion of a printer cover 252. Here, when the rear surface portion of the body case 251 and the rear surface portion of the printer cover 252 are inclined, the buffer members at the rear surface portions will not prevent the printer cover 252 from rotating at 180 degrees about a hinge 253.

The structure of the comparative example 6 basically corresponds to the structure of the printer 1 shown in FIG. 3. That is, in the printer 1, the rear surface portion 121 of the body case 2 is inclined to be oriented obliquely downward on the rear side, and the rear surface portion 123 of the printer cover 3 is inclined to be oriented obliquely upward on the rear side. Thus, the rear projecting part is formed at the boundary between the upper peripheral part 127 of the rear surface portion 121 of the body case 2 and the lower peripheral part 129 of the rear surface portion 123 of the printer cover 3. Thus, the body-side buffer members 141 at the rear surface portion 121 of the body case 2 and the cover-side buffer members 151 at the rear surface portion 123 of the printer cover 3 will not prevent the printer cover 3 from being opened nearly at the 180 degrees about the hinge 8.

However, in the comparative example 6 shown in FIGS. 15A and 15B, the body-side buffer members 254 and the cover-side buffer members 255 are not reduced in thickness enough in some regions (e.g., around the hinge 253).

As shown in FIGS. 15C and 15D, in the comparative example 7, the rear surface portion of a body case 261 and the rear surface portion of a printer cover 262 are perpendicular to the placement surface of the body case 261. Furthermore, body-side buffer members 264 whose side sectional shape is triangular are provided at the rear surface portion of the body case 261, and cover-side buffer members 265 whose side sectional shape is triangular are provided at the rear surface portion of the printer cover 262. In this case, the printer cover 262 can be opened at an angle slightly less than 180 degrees about a hinge 263.

However, in the comparative example 7 shown in FIGS. 15C and 15D, there is an area where the body-side buffer members 264 and the cover-side buffer members 265 are not thick enough (e.g., an area around the hinge 263).

As shown in FIGS. 15E and 15F, in the comparative example 8, the rear surface portion of a body case 271 and the rear surface portion of a printer cover 272 are perpendicular to the placement surface of the body case 271. At the rear surface portion of the body case 271 except for around a hinge 273, body-side buffer members 274 whose side sectional shape is quadrangle are provided. At the rear surface portion of the printer cover 272 except for around the hinge 273, cover-side buffer members 275 whose sectional shape is quadrangle are provided.

Figure 16A:
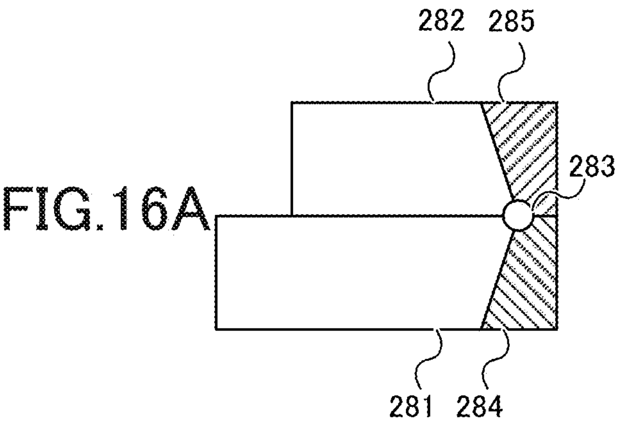
FIGS. 16A to 16C are schematic explanatory illustrations about the open angle of the printer cover.

In this case, there are not area where the body-side buffer members 274 and the cover-side buffer members 275 are not thick enough; however, the printer cover 272 can rotate only at an angle less than 90 degrees about the hinge 273. As shown in FIG. 16A for example, this shortcoming may be overcome with body-side buffer members 284 at the rear surface portion of the body case 281 and cover-side buffer members 285 at the rear surface portion of a printer cover 282. The body-side buffer members 284 and the cover-side buffer members 285 in the structure shown in FIG. 16A are thicker than the body-side buffer members 254 and the cover-side buffer members 255 in FIG. 15A, by identical thickness entirely.

The printer cover 282 in the structure in FIG. 16A cannot be opened at all.

Figure 16B:
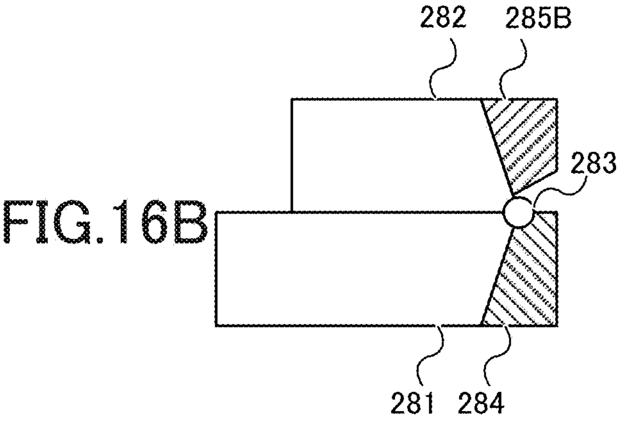

In view of the above, the structure shown in FIG. 16A is replaced by a structure shown in FIG. 16B. In the structure shown in FIG. 16B, as compared to the structure shown in FIG. 16A, the cover-side buffer members 285 are replaced with cover-side buffer members 285B. The cover-side buffer members 285B correspond to the cover-side buffer members 285 without the portion around the hinge 283.

Figure 16C:
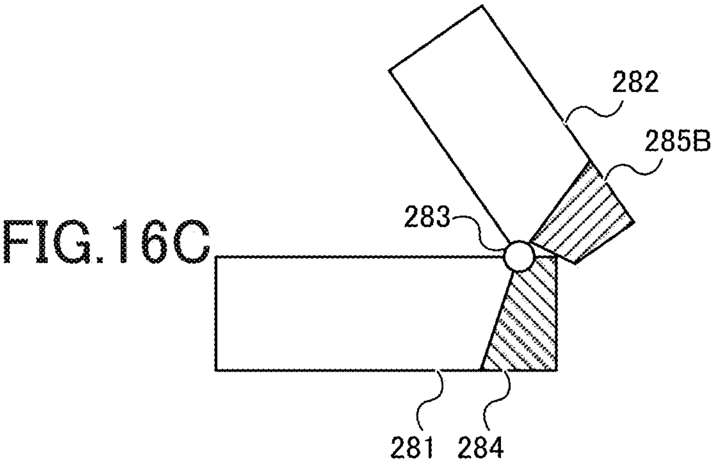
Figure 17A:
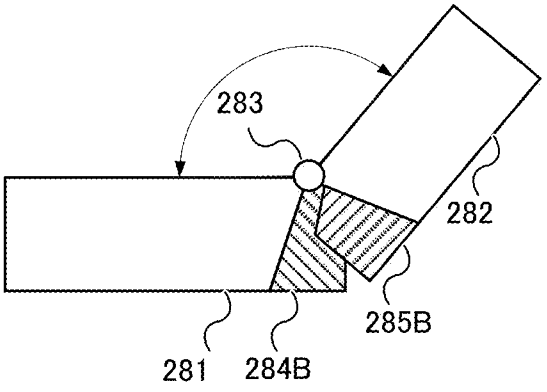
FIGS. 17A to 17C are schematic explanatory illustrations about the open angle of the printer cover.

In the structure shown in FIG. 16B, as shown in FIG. 16C, the printer cover 282 can be opened at about 60 degrees. However, when the user tries to open the printer cover 282 by, for example, about 135 degrees as shown in FIG. 17A, the cover-side buffer members 285B interfere with the body-side buffer members 284B.

Figure 17B:
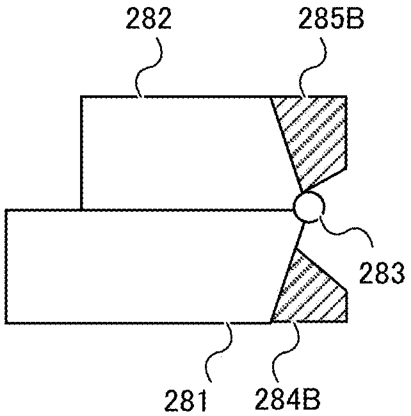

Addressing thereto, the structure shown in FIG. 16B is replaced with a structure shown in FIG. 17B. In the structure shown in FIG. 17B, as compared to the structure shown in FIG. 16B, the body-side buffer members 284 are replaced with body-side buffer members 284B. Compared with the body-side buffer members 284, a portion around the hinge 283 does not exist in the body-side buffer members 284B. This increases an open angle of the printer cover 282. In the example shown in FIG. 17C, the printer cover 282 can be opened at about 135 degrees.

Figure 17C:
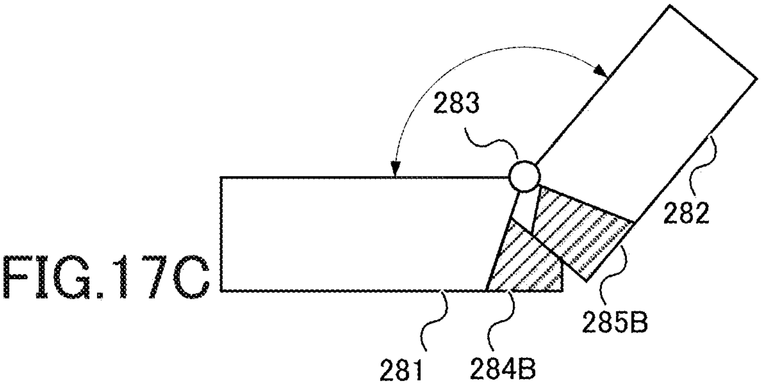

In the structure shown in FIGS. 17B and 17C, the rear surface portion of the body case 281 is inclined to be oriented obliquely downward on the rear side, and the rear surface portion of the printer cover 282 is inclined to be oriented obliquely upward on the rear side. The body-side buffer members 284B are disposed at the rear surface portion of the body case 281 except for the portion around the hinge 283. The cover-side buffer members 285B are disposed at the rear surface portion of the printer cover 282 except for the portion around the hinge 283. In this case, the printer cover 282 can be opened up to about 135 degrees about the hinge 283.

The structure shown in FIGS. 17B and 17C corresponds to the structure of the printer 1. That is, in the printer 1, the body-side buffer members 141 provided at the rear surface portion 121 of the body case 2 and the cover-side buffer members 151 provided at the rear surface portion 123 of the printer cover 3 are shaped as illustrated in FIG. 5. This allows the body-side buffer members 141 and the cover-side buffer members 151 to have thickness to some extent in the front-rear direction. While having the buffer members with some thickness, the structure of the printer 1 allows for the great maximum open angle of the printer cover 3 about the hinge 8 at which the body-side buffer members 141 and the cover-side buffer members 151 abut on each other. Specifically, a portion of the body-side buffer member 141 is removed such that each body-side buffer member 141 has the upper surface 143. A portion of the cover-side buffer member 151 is removed such that each cover-side buffer member 151 has the lower surface 154. This increases the maximum open angle of the printer cover 3 at which the body-side buffer members 141 and the cover-side buffer members 151 abut on each other. Furthermore, the maximum open angle can be adjusted by setting the removed portions as appropriate.

(11) Disposition of Hinge

Figure 23:
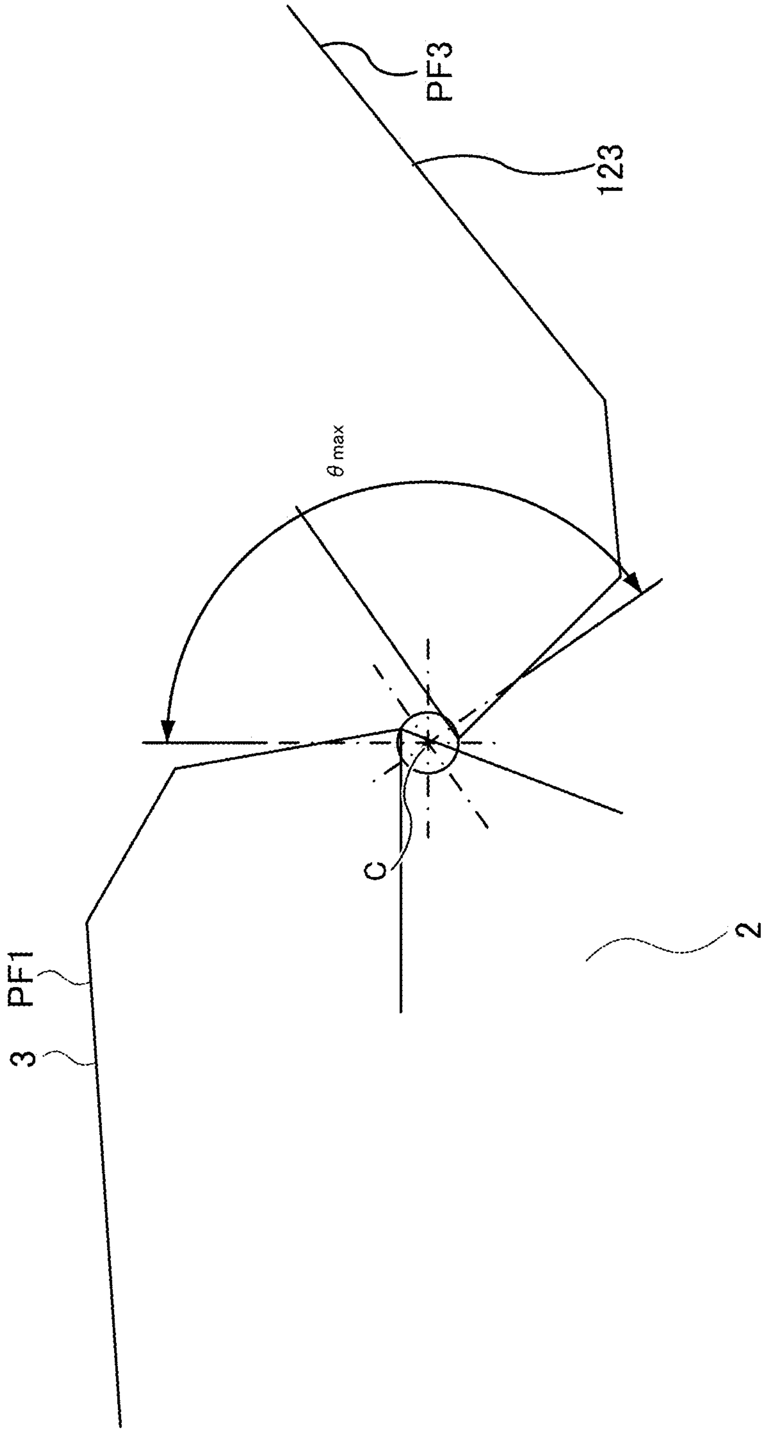
FIG. 23 is a partial side view of the printer according to an embodiment, with its printer cover open by the maximum open angle.

FIG. 23 shows the profile PF1 of the printer cover 3 at the closed position, the profile PF3 of the printer cover 3 open by the maximum open angle, and center C of the hinge shaft 81.

Since the center C of the hinge shaft 81 is at the position shown in FIG. 23, the printer cover 3 can be opened or closed between the closed position and the open position at the maximum open angle.

Figure 24:
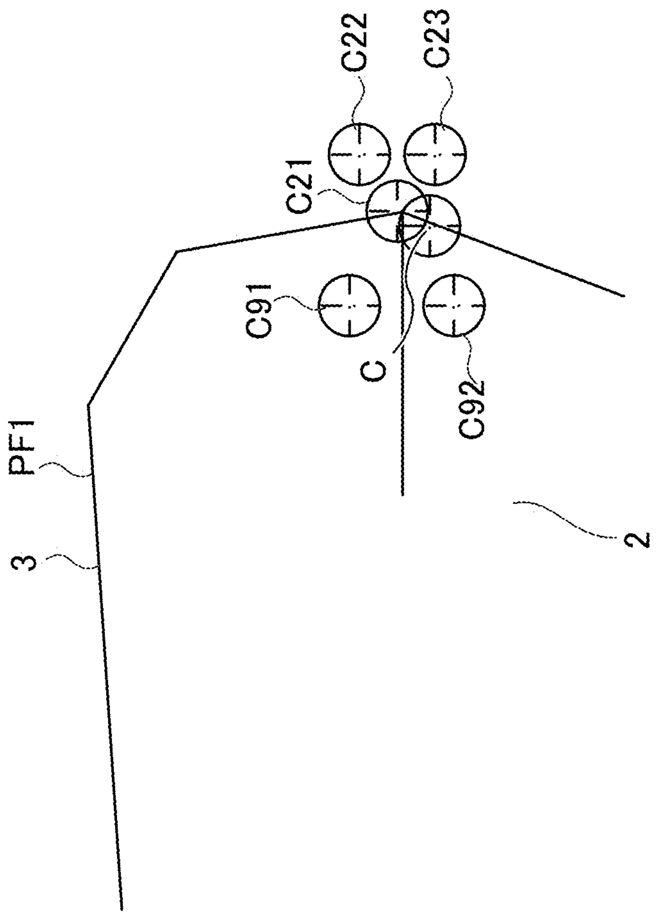
FIG. 24 is a side view of the printer according to an embodiment, and other printers showing the position of their hinges.

As shown in FIG. 24, for example, when the center of the hinge shaft 81 is C21, C22, or C23 (i.e., on the rear side than C), the printer cover 3 can be opened or closed between the closed position and the open position at the maximum open angle. However, for example, when the center of the hinge shaft 81 is C91 or C92 (i.e., on the front side than C), the printer cover 3 cannot be rotated without any structural change for preventing the printer cover from interfering with the body case.

(12) Variations

Figure 25A:
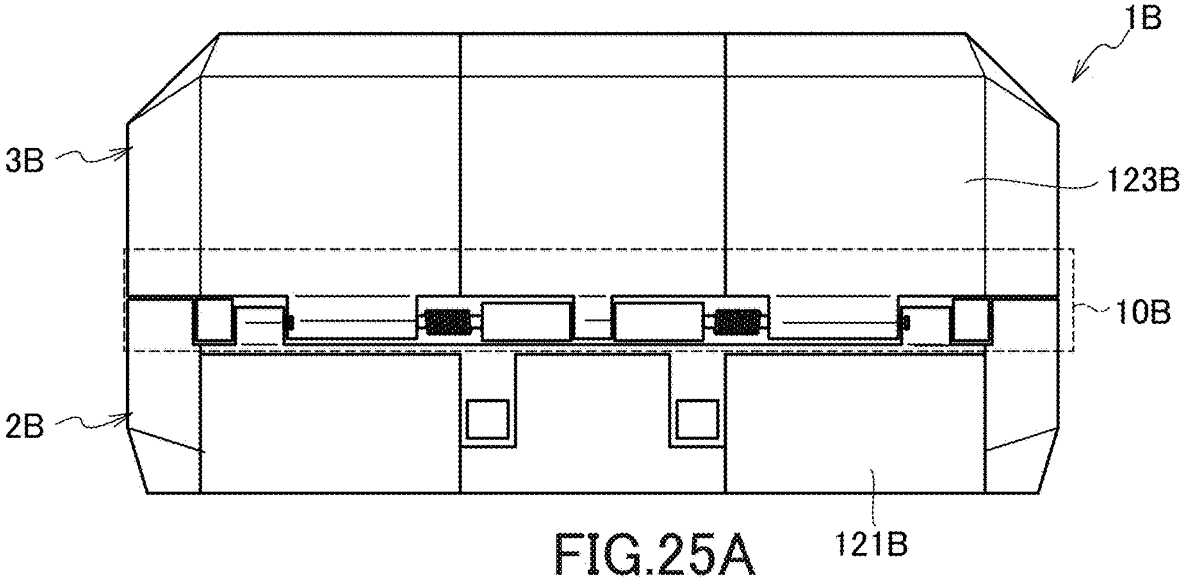
FIGS. 25A and 25B show a printer according a variation.
Figure 25B:
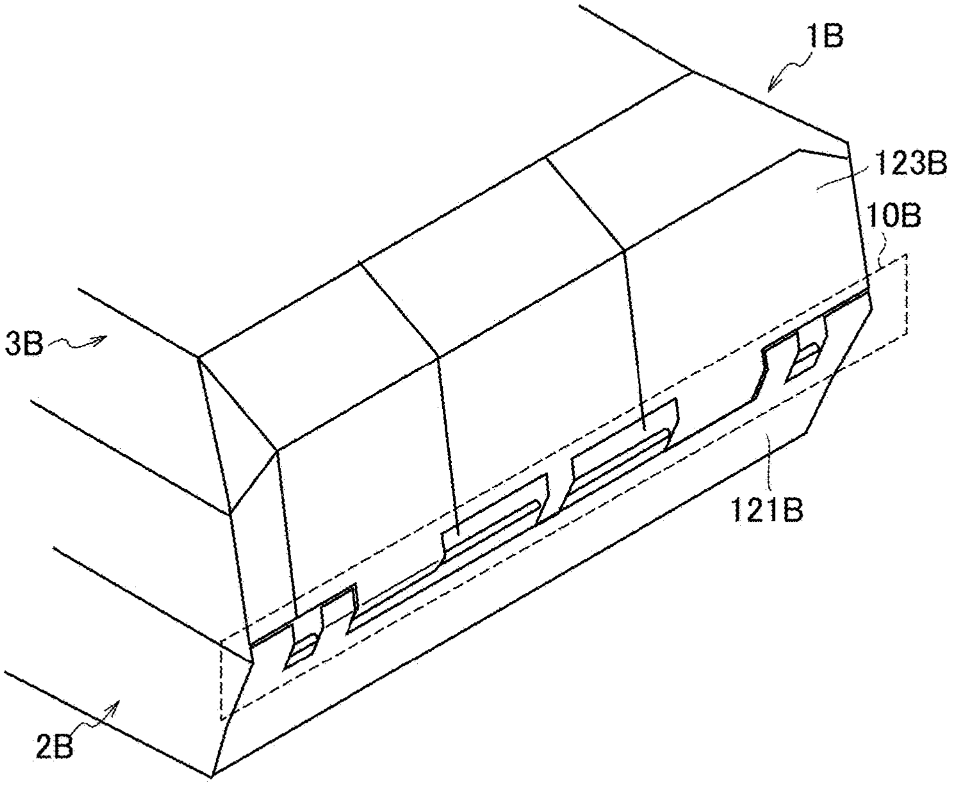

As a printer 1B shown in FIGS. 25A and 25B, a hinge 10B may be provided at a ridge line part that is formed at the joining position between the upper peripheral part of a rear surface portion 121B of a body case 2B and the lower peripheral part of a rear surface portion 123B of a printer cover 3B.

Figure 26B:
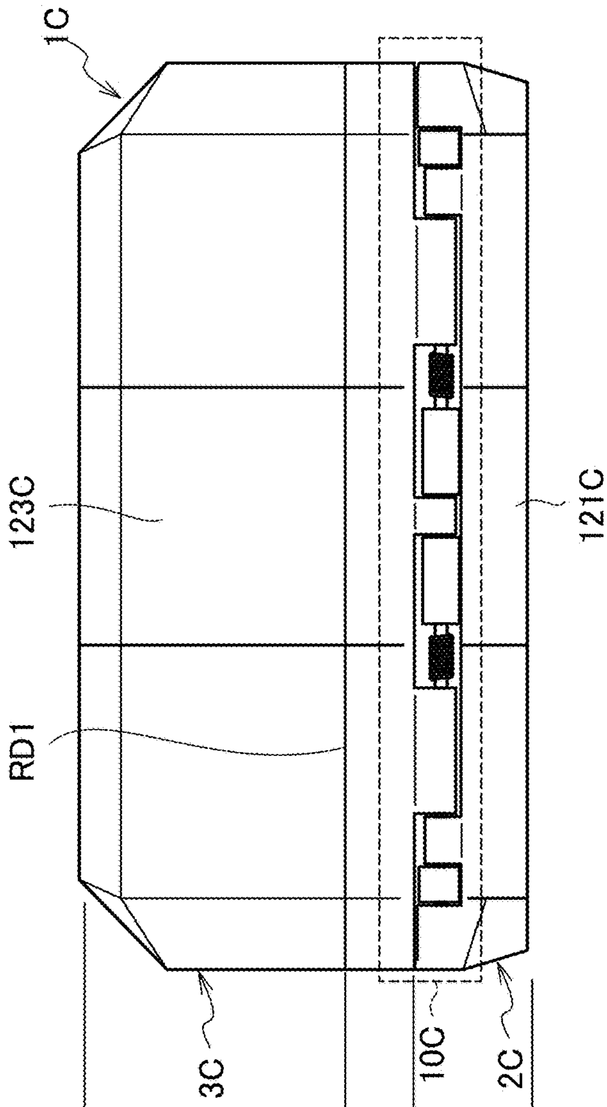
FIGS. 26A and 26B show a printer according a variation.
Figure 26A:
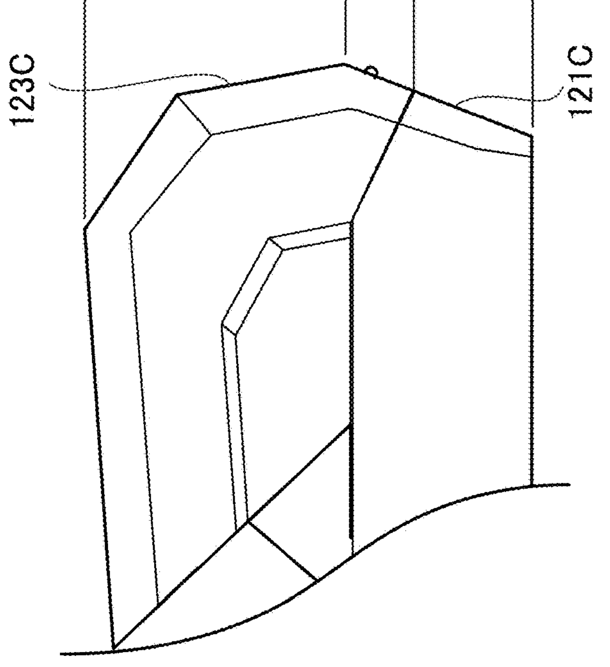

As a printer 1C shown in FIGS. 26A and 26B, a hinge 10C may be provided at a lower position than a ridge line part RD1 that is formed at the joining position between the upper peripheral part of a rear surface portion 121C of a body case 2C and the lower peripheral part of a rear surface portion 123C of a printer cover 3C.

Figure 27B:
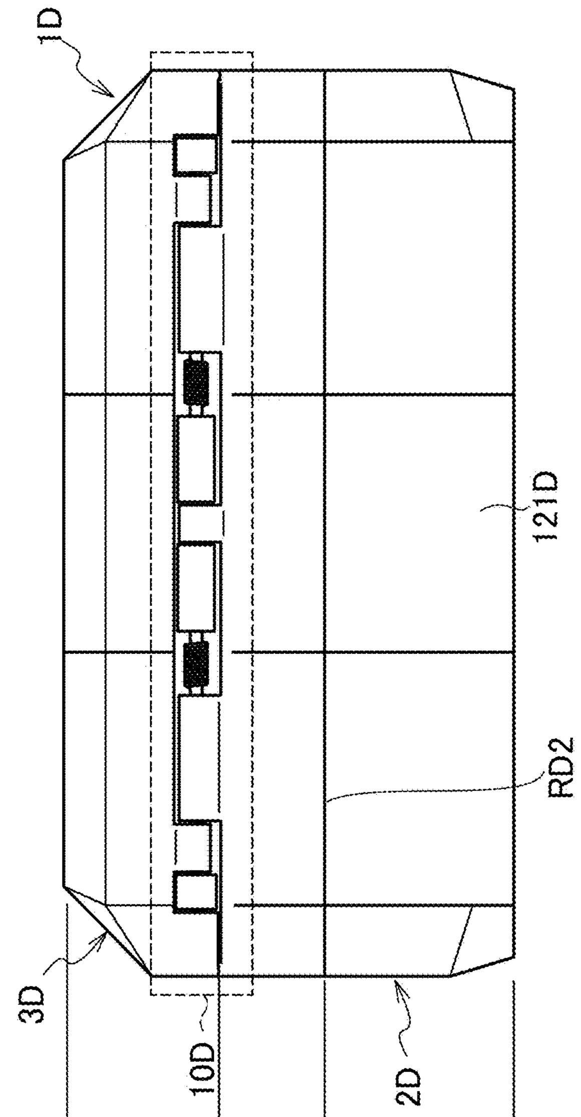
FIGS. 27A and 27B show a printer according a variation.
Figure 27A:
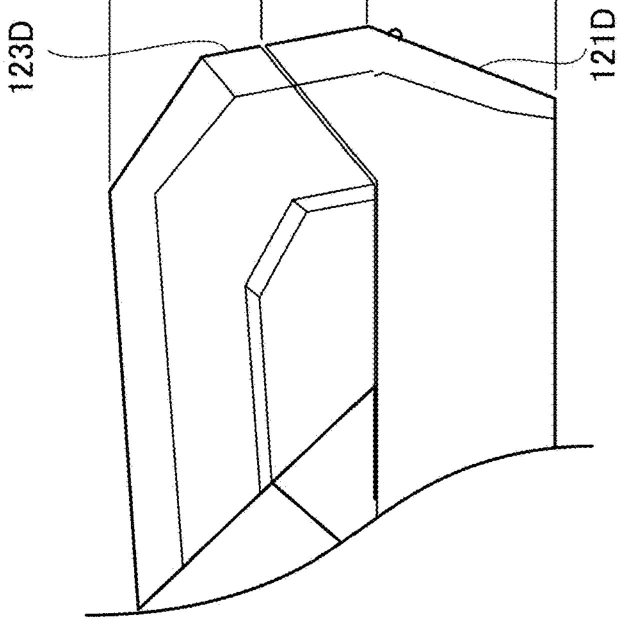

As a printer 1D shown in FIGS. 27A and 27B, a hinge 10D may be provided at a position higher than a ridge line part RD2 that is formed at the joining position between the upper peripheral part of a rear surface portion 121D of a body case 2D and the lower peripheral part of a rear surface portion 123D of a printer cover 3D.

Figure 28A:
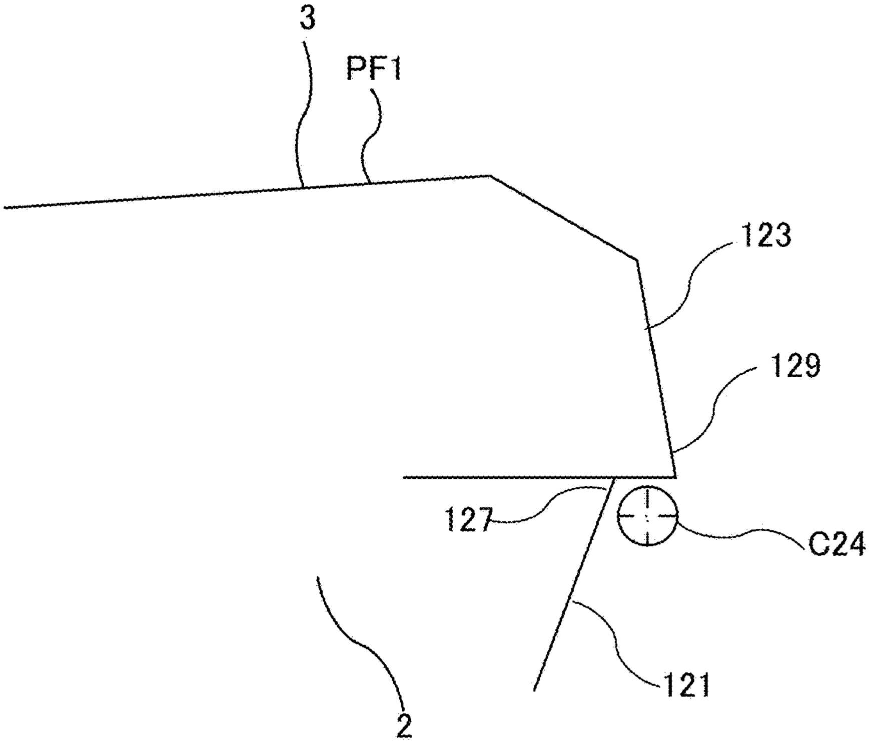
FIGS. 28A and 28B show a printer according a variation.

As shown in FIG. 28A, the printer cover 3 may be displaced rearward so that the lower peripheral part 129 of the rear surface portion 123 of the printer cover 3 is disposed on the rear side than the upper peripheral part 127 of the rear surface portion 121 of the body case 2. In this case, by disposing a hinge C24 at the illustrated position, the maximum open angle can be increased as in the case shown in FIG. 12.

Figure 28B:
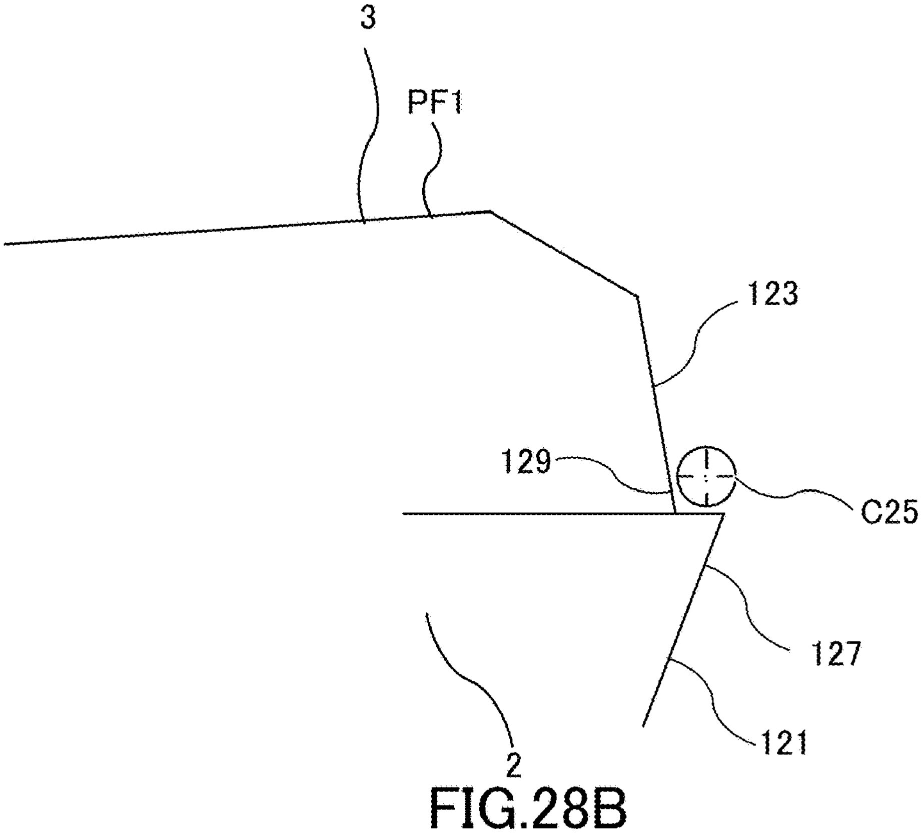

Furthermore, as shown in FIG. 28B, the printer cover 3 may be displaced frontward so that the lower peripheral part 129 of the rear surface portion 123 of the printer cover 3 is disposed on the front side than the upper peripheral part 127 of the rear surface portion 121 of the body case 2. In this case, by disposing a hinge C25 at the illustrated position, the maximum open angle can be increased as in the case shown in FIG. 12.

(13) Positional Relationship Between Body Case, Printer Cover, and Hinge

Figure 29:
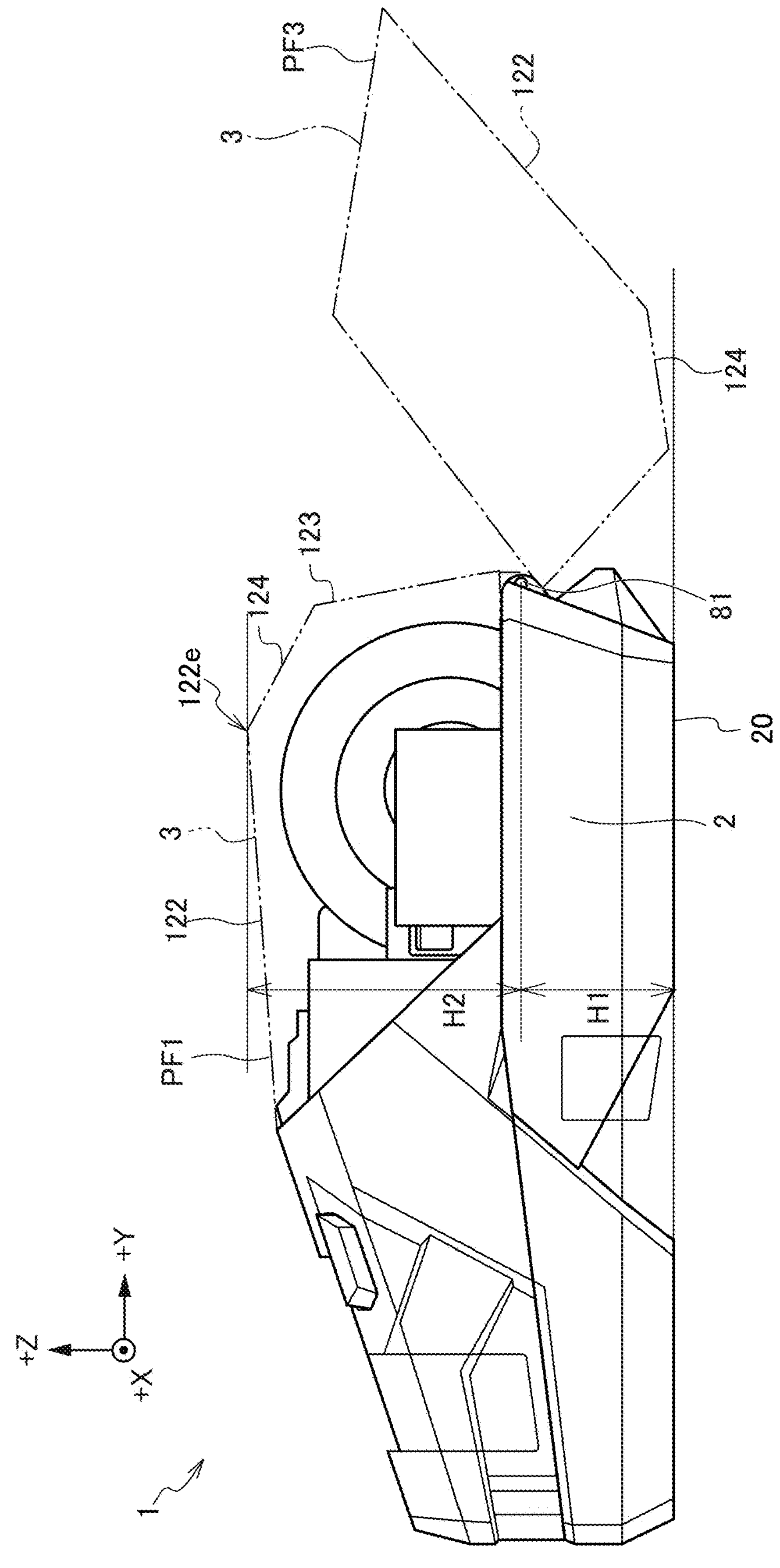
FIG. 29 is an explanatory illustration about the positional relationship between the body case, the printer cover, and the hinge of the printer according to an embodiment.

Next, a description will be given of the positional relationship between the body case 2, the printer cover 3, and the hinge 8 of the printer 1. FIG. 29 is a side view of the printer 1 according to an embodiment, showing the profile PF1 of the printer cover 3 at the closed position and the profile PF3 of the printer cover 3 open by the maximum open angle.

As described with reference to FIG. 3, the printer cover 3 of the printer 1 includes the upper surface portion 122, the inclined surface portion 124, and the rear surface portion 123. The inclined surface portion 124 is provided between the hinge shaft 81 and the upper surface portion 122, and is inclined relative to the placement surface 20.

With reference to FIG. 29, H1<H2 is established where H1 is the height from the placement surface 20 to the hinge shaft 81 and H2 is the height from the placement surface 20 to a highest position 122*e* from the hinge shaft 81 to the upper surface portion 122. That is, in the printer 1, the hinge shaft 81 is set relatively low in the height direction of the printer 1. By setting the hinge shaft 81 low in this manner, the inside of the printer is widely opened when the printer cover 3 is set at the open position. Here, since the inclined surface portion 124 is formed at the printer cover 3, the inclined surface portion 124 can be brought closer to the placement surface 20. As compared to the case where the inclined surface portion 124 is not provided, the maximum open angle of the printer cover becomes greater.

Figure 30A:
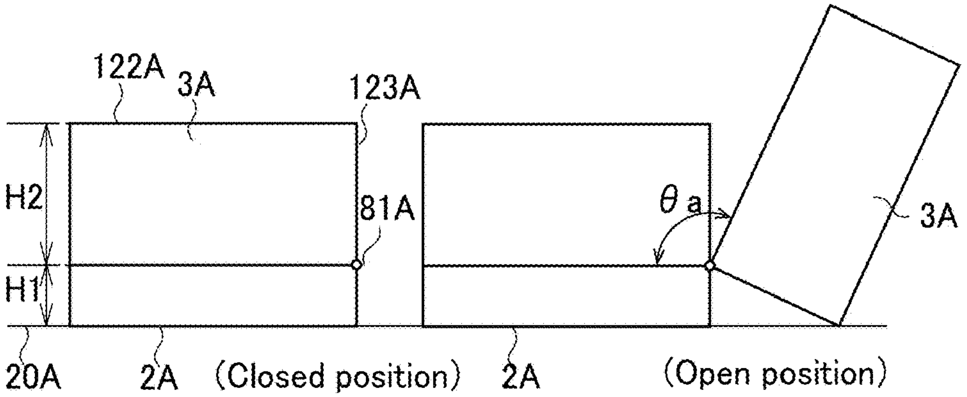
FIGS. 30A to 30D are side views of printers according to various modes in their closed position and open position.
Figure 30B:
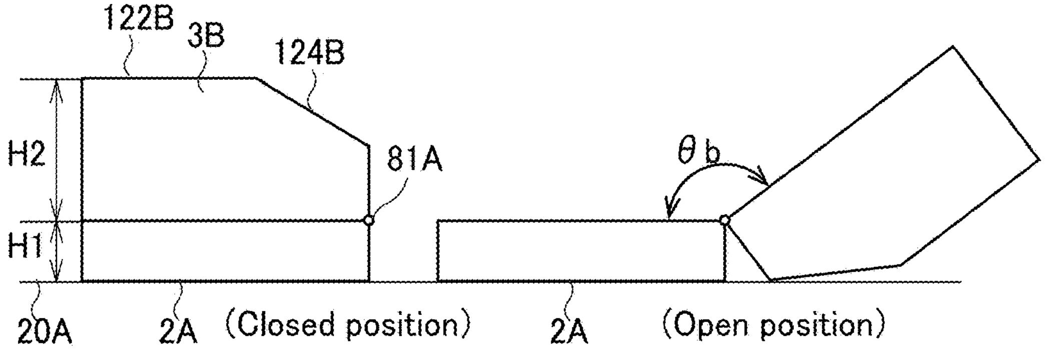
Figure 30C:
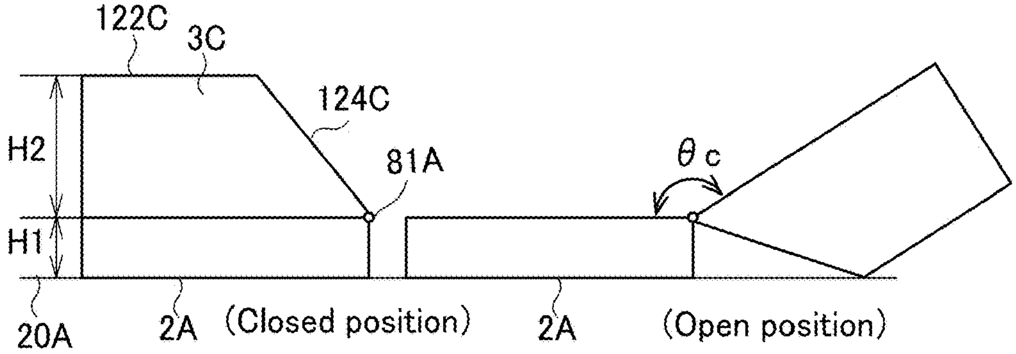
Figure 30D:
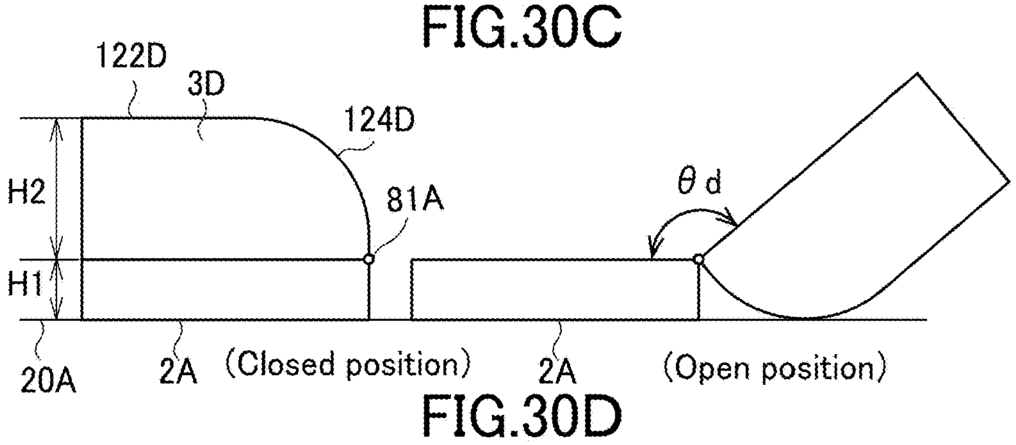

With reference to FIGS. 30A to 30D, a further description will be given of the positional relationship between the body case, the printer cover, and the hinge. FIG. 30A is a side view of a printer according to a comparative example at the closed position and at the open position. FIGS. 30B to 30D are side views of the printer according to the embodiment at the closed position and at the open position.

In any of the printers shown in FIGS. 30A to 30D, H1<H2 is satisfied where H1 is defined as the height from the placement surface 20A to the hinge shaft 81A and H2 is defined as the height from the hinge shaft 81A to the upper surface portion.

FIG. 30A shows a printer in which a body case 2A and a printer cover 3A are coupled to each other by a hinge shaft 81A. In the printer, the inclined surface portion is not formed at the printer cover 3A, and the upper surface portion 122A and the rear surface portion 123A are continuous. In this case, when the printer cover 3A is at the open position, the corner at the rear end of the printer cover 3A abuts on the placement surface 20A, which prevents a maximum open angle θa from increasing.

FIG. 30B shows a printer in which the body case 2A and a printer cover 3B are coupled to each other by the hinge shaft 81A. In the printer, an inclined surface portion 124B is formed at the printer cover 3B similarly to the printer 1 shown in FIG. 29. In this case, when the printer cover 3B is at the open position, a maximum open angle θb of the printer cover 3B can become relatively great by virtue of the inclined surface portion 124B (θb>θa).

FIG. 30C shows a printer in which the body case 2A and a printer cover 3C are coupled to each other by the hinge shaft 81A. The printer shown in FIG. 30C is different from that in FIG. 30B in that an inclined surface portion 124C of the printer cover 3C extends from the hinge shaft 81A, or from around the hinge shaft 81A, toward an upper surface portion 122C. In this case also, when the printer cover 3C is at the open position, a maximum open angle θc of the printer cover 3C can become relatively great by virtue of the inclined surface portion 124C (θc>θa).

FIG. 30D shows a printer in which the body case 2A and a printer cover 3D are coupled to each other by the hinge shaft 81A. The printer shown in FIG. 30D is different from those in FIGS. 30B and 30C in that an inclined surface portion 124D of the printer cover 3D is a curved surface. In this case also, when the printer cover 3D is at the open position, a maximum open angle θd of the printer cover 3D can become relatively great by virtue of the inclined surface portion 124D (θd>θa).

As has been described above, in the case where the hinge shaft is set relatively low to satisfy H1<H2 also, the maximum open angle of the printer cover increases by virtue of the inclined surface portion inclined relative to the placement surface between the hinge shaft and the upper surface portion in the printer.

(14) Replaceability of Roll Body

Next, with reference to FIGS. 31 and 32, a description will be given of the replaceability of the roll body R in the printer 1 according to an embodiment.

Figure 31:
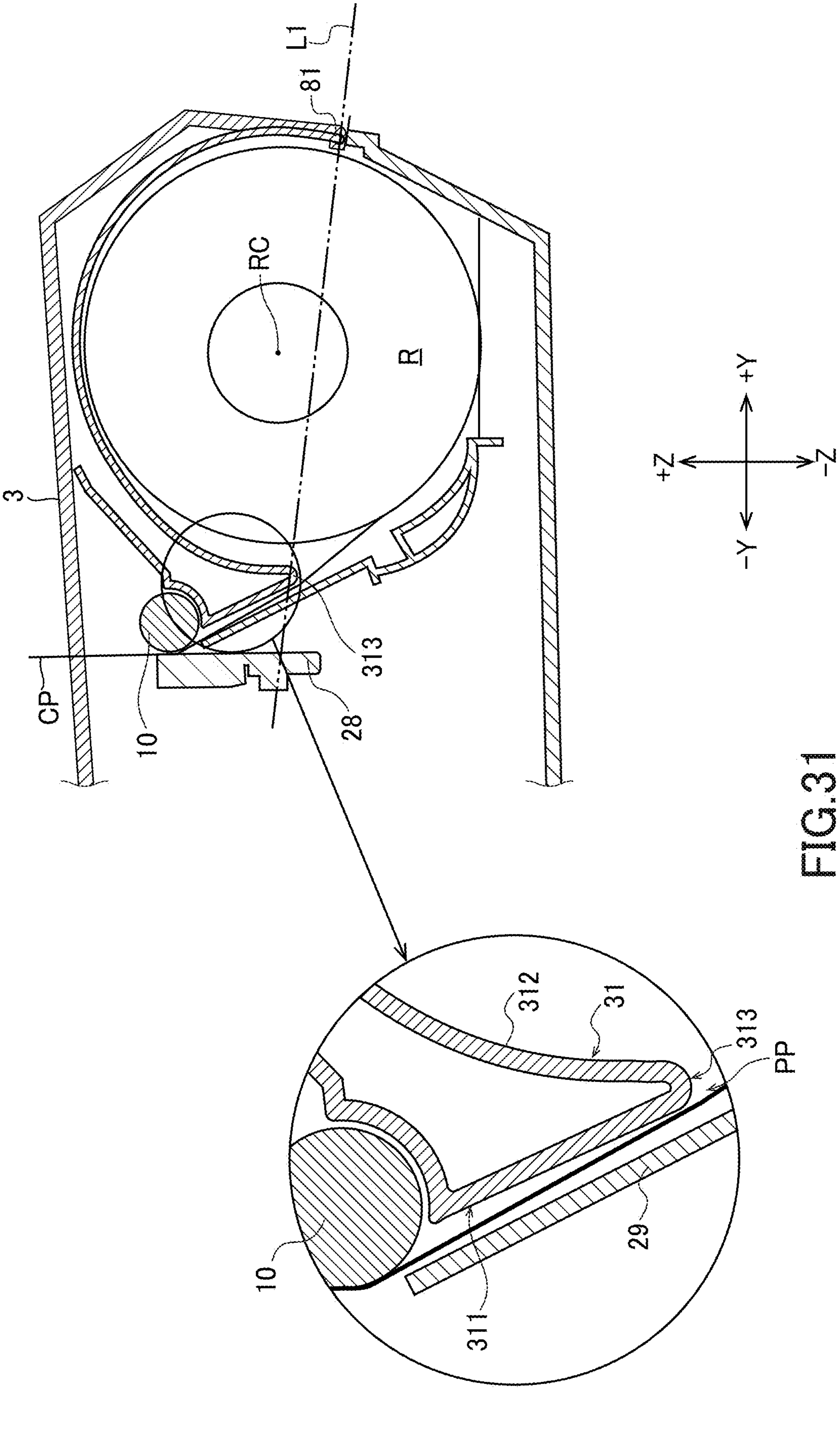
FIG. 31 is a partial cross-sectional view of the printer according to an embodiment, with its printer cover at the closed position.

FIG. 31 is a partial cross-sectional view of the printer 1 with the printer cover 3 at the closed position. FIG. 32 is a partial cross-sectional view of the printer 1 with the printer cover 3 at the open position.

Figure 32:
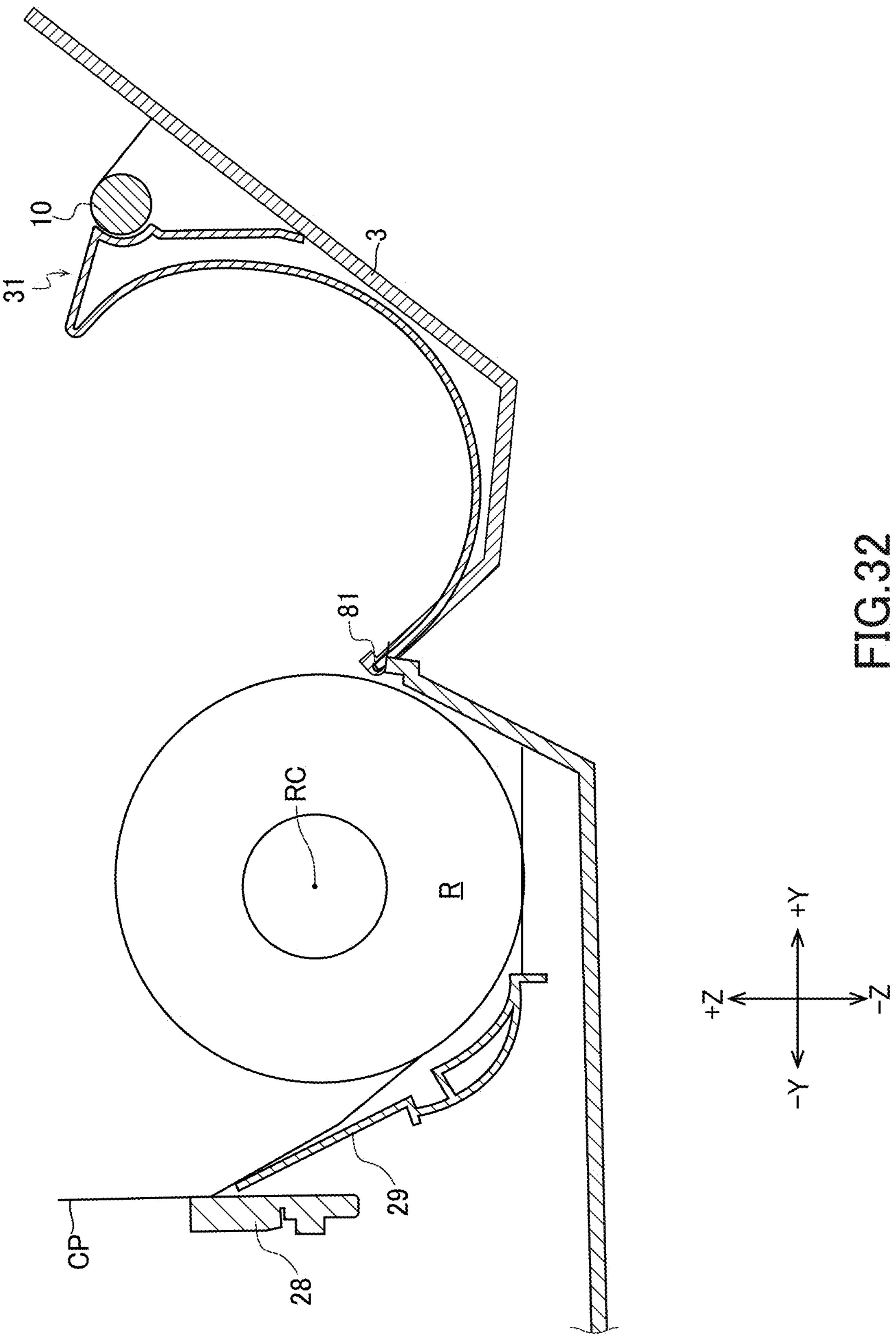
FIG. 32 is a partial cross-sectional view of the printer according to an embodiment, with its printer cover at the open position.

As shown in FIG. 32, when the printer cover 3 is at the open position, the hinge shaft 81 is at a lower position than center RC of the roll body R (identical to the center of the roll body guides 6). Accordingly, most of the outer circumferential surface of the roll body R is exposed, thereby making it easier for the user to access the roll body R near the hinge shaft 81. Thus, advantageously, the roll body R is easily replaced.

As shown in FIG. 19, the printer cover 3 includes a tapered part 31. As shown in FIG. 31, the tapered part 31 is tapered by a feeding surface 311 and a curved surface 312. The feeding surface 311 faces the continuous sheet CP drawn out from the roll body R and forms a feeding path PP. That is, as shown in FIG. 31 in an enlarged manner, when the printer cover 3 is at the closed position, the feeding surface 311 of the tapered part 31 and an inclined surface 29 inside the printer are opposed to each other with a slight clearance, thereby forming the feeding path PP for the continuous sheet CP.

The curved surface 312 is a surface along the outer circumferential surface of the roll body R. When the printer cover 3 at the closed position, the curved surface 312 supports the roll body R accommodated in the roll body accommodating chamber 9.

As shown in FIG. 31, when the printer cover 3 is at the closed position, as seen in a side view, the tapered part 31 is disposed so that a virtual line L1 connecting between a tip 313 of the tapered part 31 and the hinge shaft 81 passes a lower position than the center RC of the roll body R (i.e., the center of the roll body guides 6). Accordingly, when the printer cover 3 is set at the open position for replacing the roll body R, as shown in FIG. 32, the space where the user's hand can easily access is formed in front of the roll body R (that is, the space that has been occupied by the tapered part 31 when the printer cover 3 is at the closed position). That is, when the user removes the roll body R from the roll body accommodating chamber 9, the structure makes it easy for the user to grasp the roll body R by inserting his/her hand into the space in front of and behind the roll body R.

The present invention can be implemented in various other modes without departing from its spirit or main characteristics. Therefore, each of the embodiments is merely illustrative and should not be construed as limiting. The scope of the present invention is indicated by the claims and is not bound by the description of the specification. Any modifications or changes that fall within the equivalent scope of claims are within the scope of the present invention.

The present invention relates to Japanese Patent Applications Nos. JP 2020-191645 and JP 2021-156365 filed with the Japan Patent Office on Nov. 18, 2020 and Sep. 27, 2021, respectively, all of which are incorporated herein by reference.

The invention claimed is:

1. A printer comprising:

a body case that includes a placement surface for the printer and an accommodating chamber for accommodating a roll body into which a belt-shaped print medium are wound;

a printer cover configured to open and close the accommodating chamber;

a platen roller that is attached to the printer cover and configured to convey the belt-shaped print medium drawn out of the roll body; and a hinge that includes a hinge shaft and is configured to couple the printer cover with the body case so that the printer cover is swingable about the hinge shaft relative to the body case, wherein:

the body case comprise a first coupled part that is coupled with the printer cover via the hinge, the printer cover comprises:

an upper surface portion and an inclined surface portion, the inclined surface portion being provided between the hinge shaft and the upper surface portion and inclined relative to the placement surface, and a second coupled part that is coupled with the body case via the hinge, H1<H2 is established where H1 is defined as a height from the placement surface to the hinge shaft and H2 is defined as a height from the placement surface to a highest position from the hinge shaft to the upper surface portion, and when the printer is placed with the printer cover open such that the placement surface matches a horizontal plane, an acute angle is formed, as seen in a side view of the printer, between the first coupled part and the second coupled part, and the inclined surface portion substantially faces the horizontal plane while being spaced apart from the horizontal plane.

2. The printer according to claim 1, further comprising roll body guides configured to support both side surfaces of the roll body accommodated in the accommodating chamber, wherein the hinge shaft is disposed at a lower position than a center of the roll body guides.

3. The printer according to claim 2, wherein:

the printer cover includes: a tapered part that is tapered by a curved surface that supports the roll body accommodated in the accommodating chamber when the printer cover is at a closed position, and a feeding surface that faces the belt-shaped print medium drawn out of the roll body to form a feeding path, and the tapered part is disposed so that a virtual line passes a lower position than the center of the roll body guides as seen in a side view, the virtual line being connecting between a tip of the tapered part and the hinge shaft.

4. The printer according to claim 3, wherein the printer cover has a two-layer structure comprised of an inner printer cover and an outer printer cover.

5. The printer according to claim 4, wherein:

the body case includes a body-side buffer member, the printer cover includes a cover-side buffer member, and the body-side buffer member and the cover-side buffer member are disposed via the hinge interposed therebetween and abut on each other when the printer cover is at an open position.

6. The printer according to claim 3, wherein:

the body case includes a body-side buffer member, the printer cover includes a cover-side buffer member, and the body-side buffer member and the cover-side buffer member are disposed via the hinge interposed therebetween and abut on each other when the printer cover is at an open position.

7. The printer according to claim 2, wherein the printer cover has a two-layer structure comprised of an inner printer cover and an outer printer cover.

8. The printer according to claim 7, wherein:

the body case includes a body-side buffer member, the printer cover includes a cover-side buffer member, and the body-side buffer member and the cover-side buffer member are disposed via the hinge interposed therebetween and abut on each other when the printer cover is at an open position.

9. The printer according to claim 2, wherein:

the body case includes a body-side buffer member, the printer cover includes a cover-side buffer member, and the body-side buffer member and the cover-side buffer member are disposed via the hinge interposed therebetween and abut on each other when the printer cover is at an open position.

10. The printer according to claim 1, wherein the printer cover has a two-layer structure comprised of an inner printer cover and an outer printer cover.

11. The printer according to claim 10, wherein:

the body case includes a body-side buffer member, the printer cover includes a cover-side buffer member, and the body-side buffer member and the cover-side buffer member are disposed via the hinge interposed therebetween and abut on each other when the printer cover is at an open position.

12. The printer according to claim 1, wherein;

the body case includes a body-side buffer member, the printer cover includes a cover-side buffer member, and the body-side buffer member and the cover-side buffer member are disposed via the hinge interposed therebetween and abut on each other when the printer cover is at an open position.

13. The printer according to claim 12, wherein the body-side buffer member and the cover-side buffer member respectively have end surfaces that are positioned on an identical plane perpendicular to the placement surface when the printer cover is at the closed position.

14. The printer according to claim 1, wherein the printer cover includes an attachment part where the platen roller is detachably attached, and the attachment part is oriented upward to allow the platen roller to be attached and detached when the printer cover is at the open position.

* * * * *